(12) United States Patent
Shigemori

(10) Patent No.: US 12,045,034 B2
(45) Date of Patent: Jul. 23, 2024

(54) CONTROL SYSTEM, METHOD, AND PROGRAM TO IMPROVE DEBUGGING EFFICIENCY OF AN NC PROGRAM AND SEQUENCE PROGRAM RESPECTIVELY CONTROLLING A MACHINE TOOL AND A PERIPHERAL TARGET INSTRUMENT

(71) Applicant: OMRON CORPORATION, Kyoto (JP)

(72) Inventor: Yutsuka Shigemori, Kyoto (JP)

(73) Assignee: OMRON CORPORATION, Kyoto (JP)

(*) Notice: Subject to any disclaimer, the term of this patent is extended or adjusted under 35 U.S.C. 154(b) by 310 days.

(21) Appl. No.: 17/622,959

(22) PCT Filed: Mar. 6, 2020

(86) PCT No.: PCT/JP2020/009718
§ 371 (c)(1),
(2) Date: Dec. 27, 2021

(87) PCT Pub. No.: WO2021/019818
PCT Pub. Date: Feb. 4, 2021

(65) Prior Publication Data
US 2022/0229416 A1    Jul. 21, 2022

(30) Foreign Application Priority Data
Jul. 31, 2019  (JP) .................................. 2019-141417

(51) Int. Cl.
*G05B 19/4155*  (2006.01)
*G05B 19/4069*  (2006.01)
*G06F 3/04842*  (2022.01)

(52) U.S. Cl.
CPC ...... *G05B 19/4155* (2013.01); *G05B 19/4069* (2013.01); *G05B 2219/32043* (2013.01); *G05B 2219/35349* (2013.01); *G06F 3/04842* (2013.01)

(58) Field of Classification Search
CPC ............ G05B 19/4155; G05B 19/4069; G05B 2219/32043; G05B 2219/35349;
(Continued)

(56) References Cited

U.S. PATENT DOCUMENTS

| 5,212,645 A | * | 5/1993 | Wildes ............... G05B 19/4148 |
| | | | 702/145 |
| 2004/0056626 A1 | * | 3/2004 | Fujinawa ............. B23Q 15/013 |
| | | | 318/569 |

(Continued)

FOREIGN PATENT DOCUMENTS

| CN | 101957610 A | 1/2011 |
| CN | 102822755 A | 12/2012 |

(Continued)

OTHER PUBLICATIONS

International Search Report for PCT/JP2020/009718 dated May 26, 2020.
(Continued)

*Primary Examiner* — Alicia M. Choi
(74) *Attorney, Agent, or Firm* — Sughrue Mion, PLLC

(57) ABSTRACT

The support device acquires locus information in which a position of a machine tool corresponding to an instruction value generated by execution of an NC program is associated with time information indicating a control time using the instruction value, and variable history information in which a value of a variable updated by execution of the sequence program is associated with time information indicating an update time The support device selects a target (Continued)

period in an execution period of a program, displays a portion corresponding to the target period in transition indicated by the locus information on a display device, and displays the value of the variable in the target period on the display device based on the variable history information.

13 Claims, 20 Drawing Sheets

(58) Field of Classification Search
CPC .... G05B 19/042; G05B 19/05; G05B 19/408; G05B 19/404; G06F 3/04842; Y02P 90/02
See application file for complete search history.

(56) References Cited

U.S. PATENT DOCUMENTS

| | | | |
|---|---|---|---|
| 2010/0109594 A1* | 5/2010 | Miyaji | G05B 19/19 318/632 |
| 2011/0015877 A1 | 1/2011 | Okita et al. | |
| 2013/0006391 A1 | 1/2013 | Kito et al. | |
| 2013/0044115 A1 | 2/2013 | Oyama et al. | |
| 2017/0083017 A1 | 3/2017 | Ino | |
| 2018/0200887 A1 | 7/2018 | Geissdörfer et al. | |
| 2019/0049924 A1 | 2/2019 | Oya et al. | |
| 2019/0079499 A1 | 3/2019 | Yamamoto et al. | |
| 2019/0094831 A1 | 3/2019 | Nakano et al. | |
| 2019/0101904 A1 | 4/2019 | Shimamura et al. | |
| 2020/0401106 A1* | 12/2020 | Ootomo | G05B 19/40938 |

FOREIGN PATENT DOCUMENTS

| | | | |
|---|---|---|---|
| CN | 109491307 A | | 3/2019 |
| EP | 0 513 369 A1 | | 11/1992 |
| EP | 3 115 857 A1 | | 1/2017 |
| JP | 59-707 A | | 1/1984 |
| JP | 2000-353003 A | | 12/2000 |
| JP | 2001062676 A | * | 3/2001 |
| JP | 2006344041 A | * | 12/2006 |
| JP | 2013-012050 A | | 1/2013 |
| JP | 2016-164695 A | | 9/2016 |
| JP | 2017-059046 A | | 3/2017 |
| JP | 2019-032789 A | | 2/2019 |
| JP | 2019-049947 A | | 3/2019 |
| JP | 2019-067046 A | | 4/2019 |
| WO | 2011/114777 A1 | | 9/2011 |

OTHER PUBLICATIONS

Written Opinion for PCT/JP2020/009718 dated May 26, 2020.
Extended European Search Report dated Jun. 29, 2023 in Application No. 20847255.5.
Communication dated Feb. 8, 2024, issued in Chinese Application No. 202080046809.1.
Notice of Decision of Granting Patent Right for Invention dated Apr. 23, 2024 issued in Chinese Application No. 202080046809.1.

* cited by examiner

FIG.11

| LINE SEGMENT OBJECT ID | START POINT | | | END POINT | | | BLOCK NUMBER |
|---|---|---|---|---|---|---|---|
| | X-AXIS POSITION INFORMATION | Y-AXIS POSITION INFORMATION | Z-AXIS POSITION INFORMATION | X-AXIS POSITION INFORMATION | Y-AXIS POSITION INFORMATION | Z-AXIS POSITION INFORMATION | |
| ... | ... | ... | ... | ... | ... | ... | ... |
| 000001 | 0.0123 | 0.0143 | 1.0234 | 0.0024 | 0.0447 | 1.0234 | 1 |
| 000002 | 0.0024 | 0.0447 | 1.0234 | 0.0452 | 0.0223 | 1.0301 | 2 |
| ... | ... | ... | ... | ... | ... | ... | ... |

CONTROL SYSTEM, METHOD, AND PROGRAM TO IMPROVE DEBUGGING EFFICIENCY OF AN NC PROGRAM AND SEQUENCE PROGRAM RESPECTIVELY CONTROLLING A MACHINE TOOL AND A PERIPHERAL TARGET INSTRUMENT

CROSS REFERENCE TO RELATED APPLICATIONS

This application is a National Stage of International Application No. PCT/JP2020/009718 filed Mar. 6, 2020, claiming priority based on Japanese Patent Application No. 2019-141417 filed Jul. 31, 2019, the entire contents of each of which being herein incorporated by reference in their entireties.

TECHNICAL FIELD

The present disclosure relates to a control system that performs control according to an NC program and control according to a sequence program, and an analysis method and a program in the control system.

BACKGROUND ART

Conventionally, machine tools that follow computer numerical control (CNC) (hereinafter collectively referred to as "CNC machine tool") are used at various production sites. Such a machine tool is controlled according to a numerical control (NC) program designed by a designer.

Japanese Patent Laying-Open No. 59-707 (PTL 1) discloses a technique for displaying a tool locus on a graphic display device in order to debug the NC program. The graphic display device displays the locus corresponding to the portion of the tool locus selected from the NC program. Thus, the designer can easily check a relationship between the NC program and the tool locus.

CITATION LIST

Patent Literature

PTL 1: Japanese Patent Laying-Open No. 59-707

SUMMARY OF INVENTION

Technical Problem

In recent years, an FA system in which the machine tool controlled according to the NC program and a target instrument controlled according to a sequence program are linkage-operated has been developed. The target instrument is a peripheral device of the machine tool, for example, a conveyance device.

In such an FA system, debugging of the NC program and the sequence program is separately performed. For example, the debugging of the NC program is executed while the locus corresponding to each portion of the NC program is checked on a screen using the technique disclosed in PTL 1. The debugging of the sequence program is executed while transition of a value of a variable updated by execution of the sequence program is checked on the screen. The designer needs to debug each program such that the machine tool controlled according to the NC program and the target instrument controlled according to the sequence program perform the desired linkage operation while the separate screens are checked. For this reason, debugging efficiency is lowered and application development productivity is low.

The present disclosure has been made in view of the above problems, and an object of the present disclosure is to provide a control system, an analysis method, and a program for improving the debugging efficiency of the NC program and the sequence program that control the machine tool and the peripheral target instrument that operate in cooperation with each other.

Solution to Problem

According to one aspect of the present disclosure, a control system includes a first controller configured to control a machine tool according to an NC program, a second controller configured to control a target instrument according to a sequence program, and a support device. The first controller and the second controller are time-synchronized with each other. The support device includes a first acquisition unit and a second acquisition unit. The first acquisition unit acquires locus information in which a position of the machine tool corresponding to an instruction value generated by execution of the NC program is associated with first time information indicating a control time using the instruction value by the first controller. The second acquisition unit acquires variable history information in which a value of a variable updated by execution of the sequence program and second time information indicating an update time are associated with each other. The first time information and the second time information are generated by the first controller and the second controller, respectively. The support device further includes a selection unit, a first drawing unit, and a second drawing unit. The selection unit selects a target period in the execution periods of the NC program and the sequence program. The first drawing unit displays a first target portion corresponding to the target period in a locus indicated by the locus information on a display device. The second drawing unit displays a second target portion corresponding to the target period in transition of the value of the variable indicated by the variable history information on the display device.

According to this disclosure, the first time information included in the locus information and the second time information included in the variable history information are generated by the first controller and the second controller, which are time-synchronized with each other. For this reason, the first time information and the second time information indicate the time on the common time axis. Accordingly, the designer can easily check a relationship between the operations of the machine tool and the target instrument in the target period by checking the first target portion of the locus corresponding to the target period and the value of the variable in the target period using the display device. As a result, the debugging efficiency of the NC program and the sequence program, which control the machine tool and the target instrument around the machine tool that operate in cooperation with each other, is improved.

In the above disclosure, the first drawing unit displays the locus indicated by the locus information on the display device. The selection unit receives input of a designated section in the locus displayed on the display device, and selects the period corresponding to the designated section as the target period based on the locus information. The first drawing unit displays the first target portion in the locus displayed on the display device in a display format different from a remaining portion.

According to this disclosure, the designer can designate a portion of the locus indicated by the locus information as the designated section. Because the period corresponding to the designated section is selected as the target period, the designated section is matched with the first target portion. The first target portion in the locus is displayed in the display format different from the remaining portion. Accordingly, the designer can easily check the relative position of the designated section (that is, the first target portion) with respect to the entire locus, and easily check the value of the variable updated in the period (target period) corresponding to the designated section.

In the above disclosure, the second drawing unit displays the transition of the value of the variable indicated by the variable history information on the display device. The selection unit receives the input of the designated period in the transition displayed on the display device, and selects the designated period as the target period. The second drawing unit displays the second target portion in the transition displayed on the display device in the display format different from the remaining portion.

According to this disclosure, the designer can designate the period to be checked from the transition of the value of the variable indicated by the variable history information as the designated period. Because the designated period is selected as the target period, the portion in the locus corresponding to the designated period is the first target portion, and the first target portion is displayed on the display device. Consequently, the designer can easily check the relationship between the transition of the value of the variable and the position of the machine tool in the designated period.

In the above disclosure, the support device further includes a third drawing unit that displays a source code of a third target portion executed in the target period of the NC program on the display device.

According to this disclosure, the designer can easily check the relationship between the NC program executed in the target period and the position of the machine tool in the target period, and becomes easy to debug the NC program.

In the above disclosure, the support device further includes a fourth drawing unit that displays a source code of a fourth target portion related to a signal in the sequence program on the display device in response to a fact that a command outputting the signal to the second controller is included in the third target portion of the NC program.

According to this disclosure, the designer can easily check the source code of the sequence program related to the signal output according to the NC program in the target period, and becomes easy to debug the sequence program.

In the above disclosure, the first controller and the second controller are included in one control device, and operate by using a common timer included in the control device.

According to this disclosure, the first controller and the second controller can be easily time-synchronized with each other.

In the above disclosure, the first controller and the second controller include a first timer and a second timer that are time-synchronized with each other, respectively.

According to this disclosure, even when the first controller and the second controller are provided in separate devices, the first controller and the second controller can be easily time-synchronized with each other.

According to another aspect of the present disclosure, a control system includes a first controller configured to control a machine tool according to an NC program and a second controller configured to control a target instrument according to a sequence program. The first controller and the second controller are time-synchronized with each other. The analysis method in the control system includes first and second steps. The first step is a step of acquiring locus information in which a position of the machine tool corresponding to an instruction value generated by executing of the NC program is associated with first time information indicating a control time using the instruction value by the first controller. The second step is a step of acquiring variable history information in which a value of a variable updated by execution of the sequence program is associated with second time information indicating an update time. The first time information and the second time information are generated by the first controller and the second controller, respectively. The analysis method further includes a third step to a fifth step. The third step is a step of selecting a target period from execution periods of the NC program and the sequence program. The fourth step is a step of displaying a first target portion corresponding to the target period in a locus indicated by the locus information on a display device. The fifth step is a step of displaying a second target portion corresponding to the target period in transition of the value of the variable indicated by the variable history information on the display device.

According to still another example of the present disclosure, a program causes a computer to execute the above analysis method in a control system.

These disclosures also improve the debugging efficiency of the NC program and the sequence program, which control the machine tool and the target instrument around the machine tool that operate in cooperation with each other.

Advantageous Effects of Invention

According to the present disclosure, the debugging efficiency of the NC program and the sequence program, which control the machine tool and the target instrument around the machine tool that operate in cooperation with each other, is improved.

BRIEF DESCRIPTION OF DRAWINGS

FIG. 11 is a view illustrating an example of line segment information.

DESCRIPTION OF EMBODIMENTS

Figure 1:
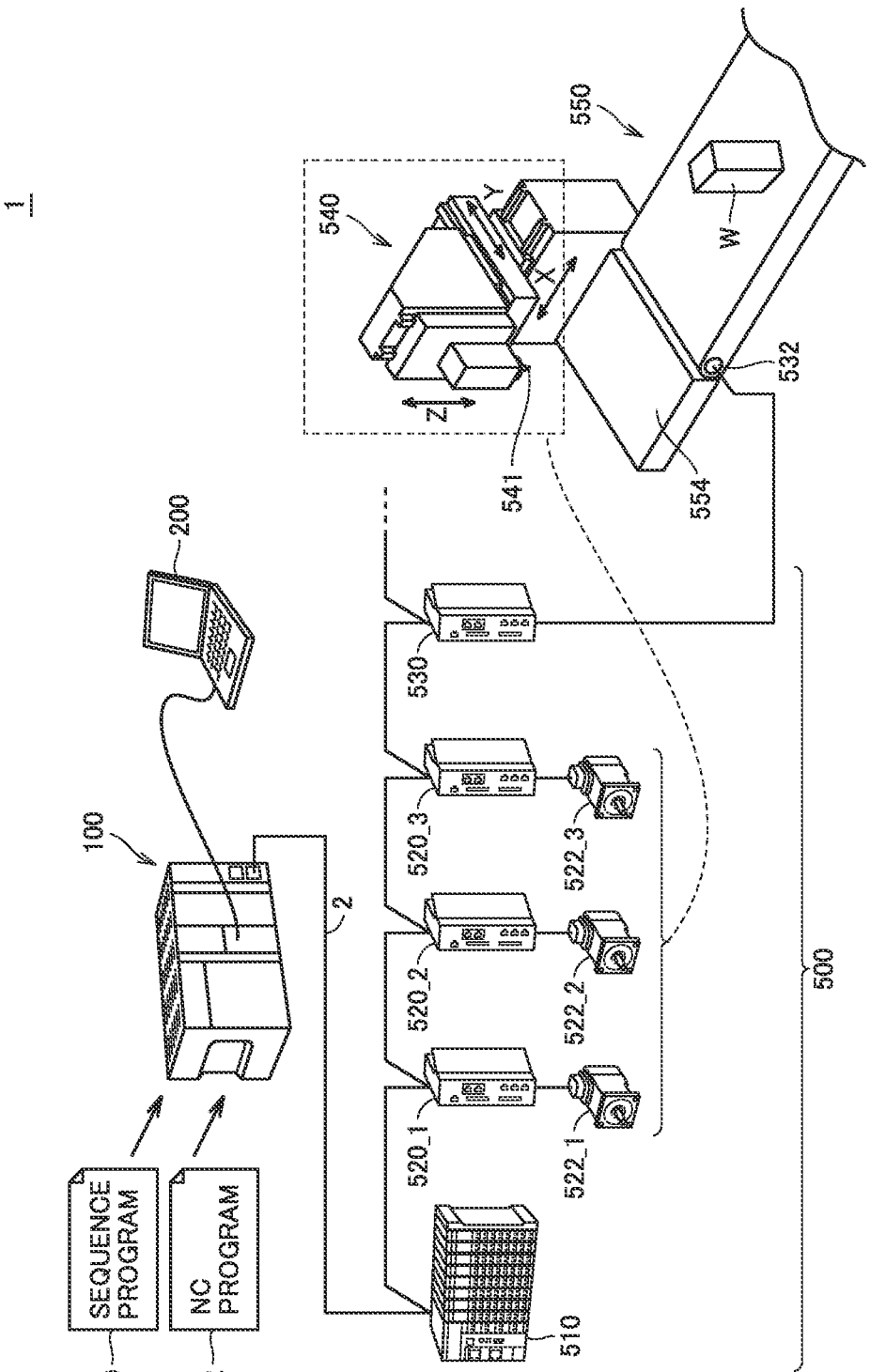
FIG. 1 is a schematic diagram illustrating an overall configuration example of a control system according to an embodiment.

An embodiment of the present invention will be described in detail with reference to the drawings. The same or equivalent portion in the drawings is denoted by the same reference numeral, and the description will not be repeated.

§ 1 Application Example

With reference to FIGS. 1 to 5, an example of a scene to which the present invention is applied will be described.

<1-A. Overall Configuration of Control System>

FIG. 1 is a schematic diagram illustrating an overall configuration example of a control system according to an embodiment. A control system 1 in FIG. 1 includes a control device 100, a support device 200, and a field device 500.

Control device 100 corresponds to an industrial controller that controls various facilities and devices. Control device 100 is a kind of computer that performs a control arithmetic operation described below, and may be typically embodied as a PLC (programmable logic controller).

Control device 100 is connected to various field devices 500 through a field network 2. Control device 100 exchanges data with one or a plurality of field devices 500 through field network 2 and the like.

The control arithmetic operation performed by control device 100 includes processing (input processing) of collecting data (input data) collected or generated by field device 500, processing (arithmetic processing) of generating data (output data) such as an instruction value to field device 500, and processing (output processing) of transmitting the generated output data to field device 500.

Field network 2 preferably adopts a bus or a network that performs constant periodic communication. EtherCAT (registered trademark), EtherNet/IP (registered trademark), DeviceNet (registered trademark), CompoNet (registered trademark), and the like are known as the bus or the network that performs the constant periodic communication. Ether-CAT (registered trademark) is preferred in that an arrival time of the data is guaranteed.

Any field device 500 can be connected to field network 2. Field device 500 includes an actuator that exerts some physical action on a manufacturing device and a production line on the field side, an input and output device that exchanges information with and from the field, and the like.

The data is exchanged between control device 100 and field device 500 through field network 2. These exchanged data are updated in a very short control period of several hundred μsec order to several tens of msec order.

Control device 100 in FIG. 1 controls a CNC machine tool 540 and a conveyance device 550 that supplies a workpiece W to CNC machine tool 540.

CNC machine tool 540 processes workpiece W by controlling the machining center and the like according to an NC program 32 designating a position or speed of a tool 541. Tool 541 is a part processing workpiece W. CNC machine tool 540 is not limited to the illustrated one, but can be applied to any processing device such as lathe machining, milling machine, and electric discharge machining. Conveyance device 550 is controlled according to a sequence program 30.

CNC machine tool 540 and conveyance device 550 are driven according to the instruction value from control device 100. Workpiece W conveyed by conveyance device 550 is disposed on a work table 554, and the processing designated by CNC machine tool 540 is performed.

Field device 500 in FIG. 1 includes a remote input and output (I/O) device 510, servo drivers 520_1, 520_2, 520_3, servo motors 522_1, 522_2, 522_3, and a servo driver 530.

Remote I/O device 510 typically includes a communication coupler that conducts communication through field network 2 and an input and output unit (hereinafter, also referred to as "I/O unit") that acquires the input data and outputs the output data. A device that collects the input data such as an input relay and various sensors (for example, an analog sensor, a temperature sensor, and a vibration sensors), an output relay, a contactor, a servo driver, and a device that exerts some action on the field such as an actuator are connected to remote I/O device 510.

Field device 500 is not limited to these, but an arbitrary device (for example, a visual sensor) that collects the input data, an arbitrary device (for example, an inverter device) that exerts some action according to the output data, various robots, and the like can be adopted as field device 500.

Servo motors 522_1, 522_2, 522_3 are incorporated as part of CNC machine tool 540, and servo driver 530 drives servo motor 532 connected to a conveyor of conveyance device 550. Servo drivers 520_1 to 520_3, 530 drive the corresponding servomotors according to the instruction value (a position instruction value, a speed instruction value, and the like) from control device 100.

Servo motors 522_1, 522_2, 522_3 in FIG. 1 are drive sources for an X-axis, a Y-axis, and a Z-axis of CNC machine tool 540, respectively. Preferably these three axes are integrally controlled.

Control device 100 of the embodiment generates an instruction value according to a sequence command and a motion command by executing sequence program 30, and generates an instruction value controlling the behavior of CNC machine tool 540 by executing NC program 32. A start and an end of the execution of NC program 32 may be controlled by the control instructions included in sequence program 30.

A support device 200 can be connected to control device 100. Support device 200 is a device that supports preparation required for control device 100 to control the control target. Specifically, support device 200 provides a development environment (program producing and editing tool, parser, compiler, and the like) of a program (including NC program 32 and sequence program 30) executed by control device 100, the control device 100, a setting environment for setting the configuration information (configuration) of control device 100 and various devices connected to control device 100, a function of outputting the generated program to control device 100, a function of modifying and changing (debugging) the program executed on control device 100 online, and the like.

<1-B. Functional Configuration of Control Device>

Figure 2:
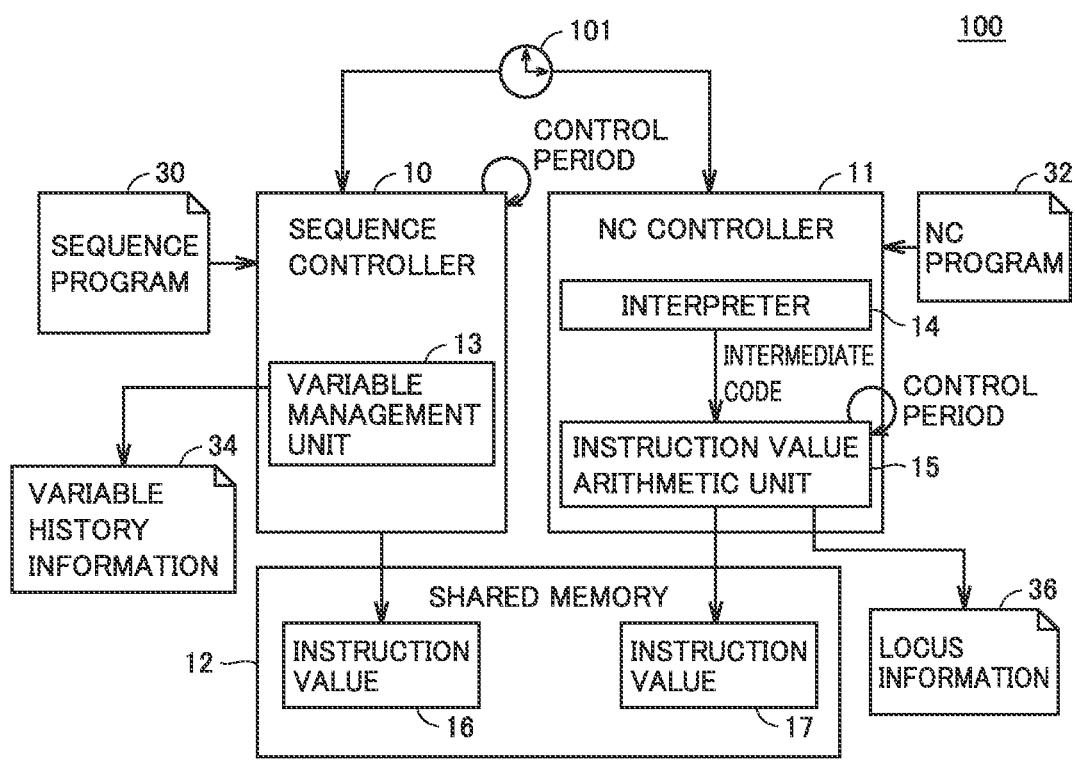
FIG. 2 is a schematic diagram illustrating a functional configuration example of the control device of the embodiment.

FIG. 2 is a schematic diagram illustrating a functional configuration example of control device 100 of the embodiment. Control device 100 in FIG. 2 includes a sequence controller 10, an NC controller 11, and a shared memory 12.

As used herein, the term "sequence program" includes a program, in which the entire program is scanned for each execution and one or a plurality of instruction values are calculated for each execution. The "sequence program" typically includes a program including one or the plurality of commands written according to International Standard IEC 61131-3 defined by International Electrotechnical Commission (IEC). The "sequence program" can include a sequence command and/or a motion command. The "sequence program" is not limited to the command described according to the international standard IEC 61131-3, but may include the command independently defined by a manufacturer or a vendor of a programmable logic controller (PLC). The "sequence program" is suitable for control that requires immediacy and high speed.

A source code of the "sequence program" includes a variable name, a variable type, an LD/ST command, and a parameter.

The "NC program" is a program that is sequentially interpreted, and is written in a language that can be executed by an interpreter type that is executed by sequential interpretation line by line. For example, NC program 32 is written using "G language".

The source code of the "NC program" includes a block number, a G code number or an M code number, and a parameter for each line (block). The G-code prescribes a preparatory function such as positioning and orientation designation of machine tool 540. The M code prescribes an auxiliary function for processing. The M code includes a code for outputting an external signal. The external signal can also be used in the source code of sequence program 30.

Sequence controller 10 scans entire sequence program 30 every control period and updates instruction value 16. More specifically, sequence controller 10 executes (scans) sequence program 30 at predetermined control periods according to a timer 101 included in control device 100 to update one or a plurality of instruction values 16. Sequence program 30 can include the sequence command and the motion command. The sequence command prescribes one or a plurality of logical arithmetic operations including an input value, an output value, and an internal value. The motion command prescribes a numerical arithmetic procedure such as position, speed, acceleration, jerk, angle, angular velocity, angular acceleration, and angular jerk for an actuator such as a servo motor.

Sequence controller 10 includes a variable management unit 13 that manages the variable updated by the execution of sequence program 30. The "variable" can include the input data acquired from field device 500, the output data (instruction value 16) given to field device 500, and the data temporarily calculated to execute the control arithmetic operation. The value of the variable is updated in each control period. Variable management unit 13 generates variable history information 34 in which the value of the variable and the time information about the control period are associated with each other in each control period. The time information included in variable history information 34 is generated according to timer 101 and indicates the update time of the value of the variable.

NC controller 11 updates an instruction value 17 in each control period according to NC program 32 that is sequentially interpreted. More specifically, NC controller 11 executes NC program 32 by the interpreter type. However, the calculation (update) of instruction value 17 by NC controller 11 is repeatedly executed in each control period. NC controller 11 calculates instruction value 17 according to NC program 32 in synchronization with the calculation of instruction value 16 by sequence controller 10 according to timer 101. In order to implement the calculation of instruction value 17 in each control period, NC controller 11 includes an interpreter 14 and an NC instruction value arithmetic unit 15.

Interpreter 14 interprets at least a part of NC program 32, generates an intermediate code, and sequentially stores the generated intermediate code in an intermediate code buffer (not illustrated). Interpreter 14 previously generates the intermediate code from NC program 32 to some extent. For this reason, sometimes a plurality of intermediate codes are stored in the intermediate code buffer.

NC instruction value arithmetic unit 15 calculates instruction value 17 in each control period according to the intermediate code generated previously by interpreter 14. In general, because the instruction (code) described in the NC program is sequentially interpreted, there is no guarantee that instruction value 17 can be calculated in each arithmetic period. However, using the intermediate code, the instruction value 17 can be calculated in each control period.

Figure 3:
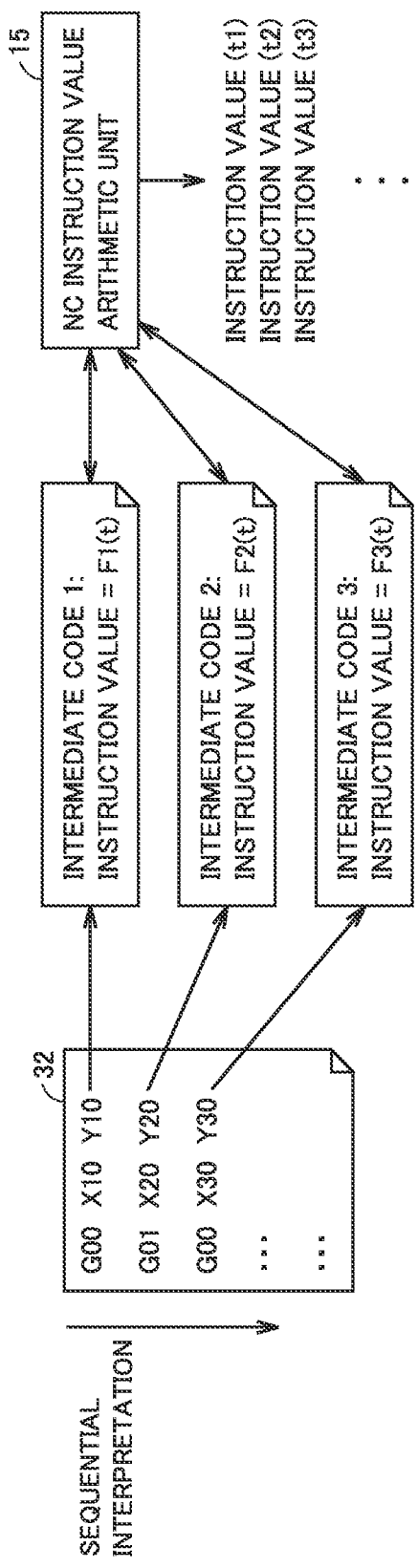
FIG. 3 is a schematic diagram conceptually illustrating processing performed by an NC controller of the control device of the embodiment.

FIG. 3 is a schematic diagram conceptually illustrating processing performed by the NC controller of the control device of the embodiment.

In general, the NC program contains the code that is sequentially interpreted by the interpreter type, and the time required for sequentially interpreting each code varies depending on a content described by each code. That is, because the sequential interpretation is performed by the interpreter type, the instruction value is not easily calculated in each control period.

Accordingly, in control device 100 of the embodiment, interpreter 14 of NC controller 11 interprets one or the plurality of codes described in NC program 32, and generates the intermediate code to calculate the instruction value in each control period based on the interpreted content. Because the intermediate code is generated for each one or the plurality of codes described in NC program 32, a plurality of intermediate codes are usually generated from one NC program 32. The generated intermediate code is sequentially queued in the intermediate code buffer.

In each intermediate code, a function capable of calculating the instruction value by inputting the variable related to time may be prescribed. That is, the intermediate code may be a function for NC instruction value arithmetic unit 15 to update the instruction value in every control period. Using such a function, NC instruction value arithmetic unit 15 can calculate the instruction value in each control period by sequentially referring to the generated intermediate code.

More specifically, the intermediate code may be a function that prescribes the relationship between the time and the instruction value. The time, the elapsed time from a certain reference timing, the number of cumulative cycles of the control periods, and the like can be used as the time-related variable prescribing the intermediate code.

For example, when the first intermediate code prescribes the instruction value over a period of 10 times the control period, NC instruction value arithmetic unit 15 queues the first intermediate code to calculate periodically the instruction value over the period of 10 control periods. Similarly, for other intermediate codes, the instruction value can be basically calculated over a plurality of control periods.

Accordingly, when the intermediate code generation processing from NC program 32 by interpreter 14 is executed sufficiently earlier than the instruction value arithmetic processing by NC instruction value arithmetic unit 15, the processing according to NC program 32 can be executed in synchronization with the processing according to sequence program 30.

Figure 4:
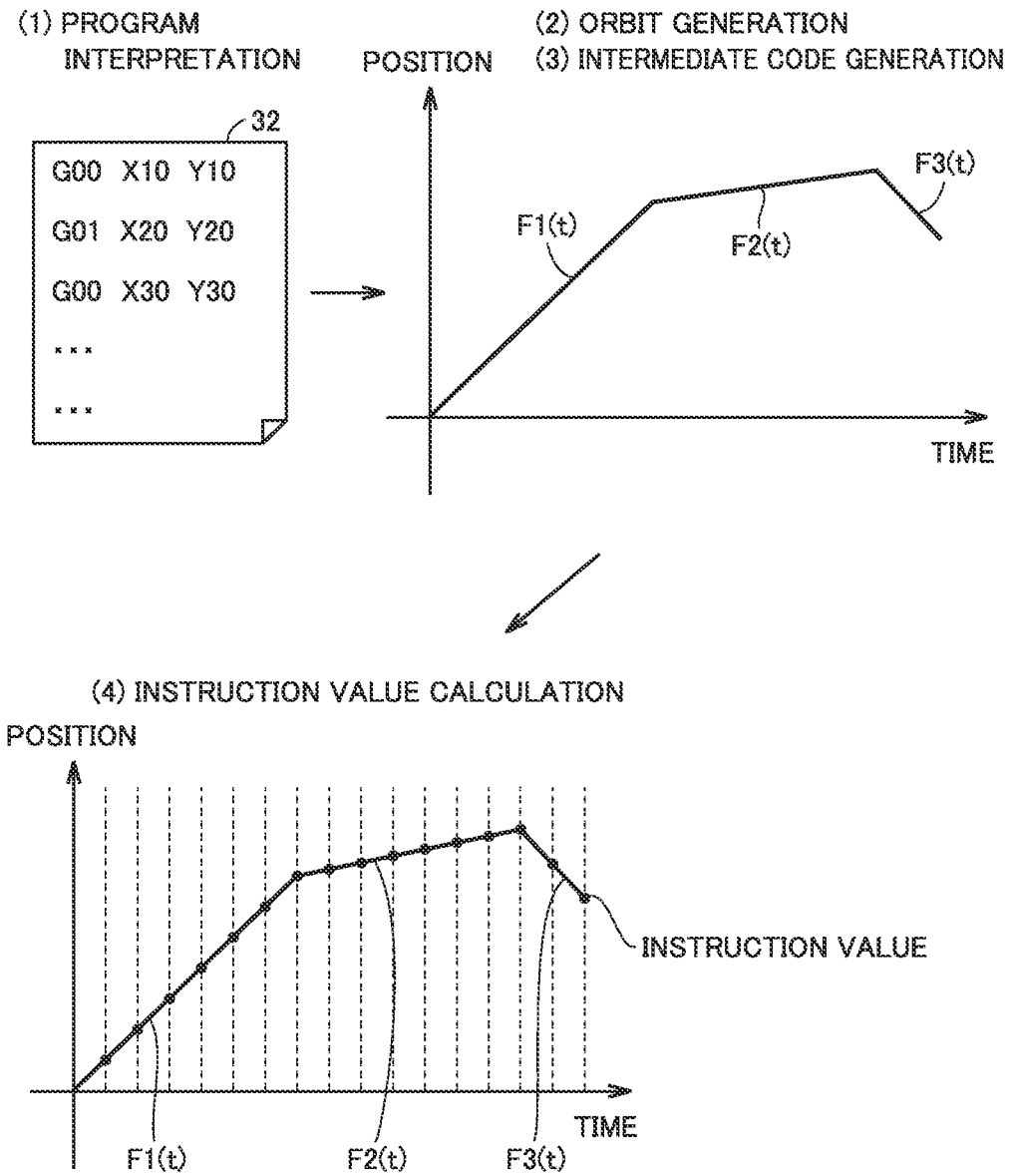
FIG. 4 is a schematic diagram illustrating a specific example of the processing in the NC controller.

FIG. 4 is a schematic diagram illustrating a specific example of the processing in the NC controller. As illustrated in FIG. 4, when executing sequentially NC program 32, interpreter 14 of NC controller 11 interprets each command contained in NC program 32 ((1) program interpretation). A prescribed orbit is internally generated by the interpretation of the command ((2) orbit generation). Finally, interpreter 14 generates one or a plurality of functions (intermediate codes) that prescribe the generated orbit ((3) intermediate code generation).

As an example of the intermediate code, it may be a function that prescribes the relationship between the time and the instruction value (the position instruction value or the speed instruction value). The orbit in FIG. 4 is prescribed by a combination of straight lines. The orbit for each straight line is represented by functions $F1(t)$, $F2(t)$, $F3(t)$ that indicate the relationship between the time and the position.

NC instruction value arithmetic unit 15 of NC controller 11 calculates the instruction value in each control period according to the generated intermediate code. In the example of FIG. 4, the instruction value at that time is uniquely determined by inputting the time of each control period in functions $F1(t)$, $F2(t)$, $F3(t)$.

Returning to FIG. 2, NC instruction value arithmetic unit 15 generates locus information 36 in which the position of tool 541 corresponding to instruction value 17 calculated in each control period and the time information indicating the control time using the instruction value are associated with each other. The time information is generated using timer 101.

<1-C. Support Screen Generation Processing Performed by Support Device>

Support device 200 provides a screen (hereinafter, referred to as "support screen") that assists the debugging of sequence program 30 and NC program 32 to the designer.

Figure 5:
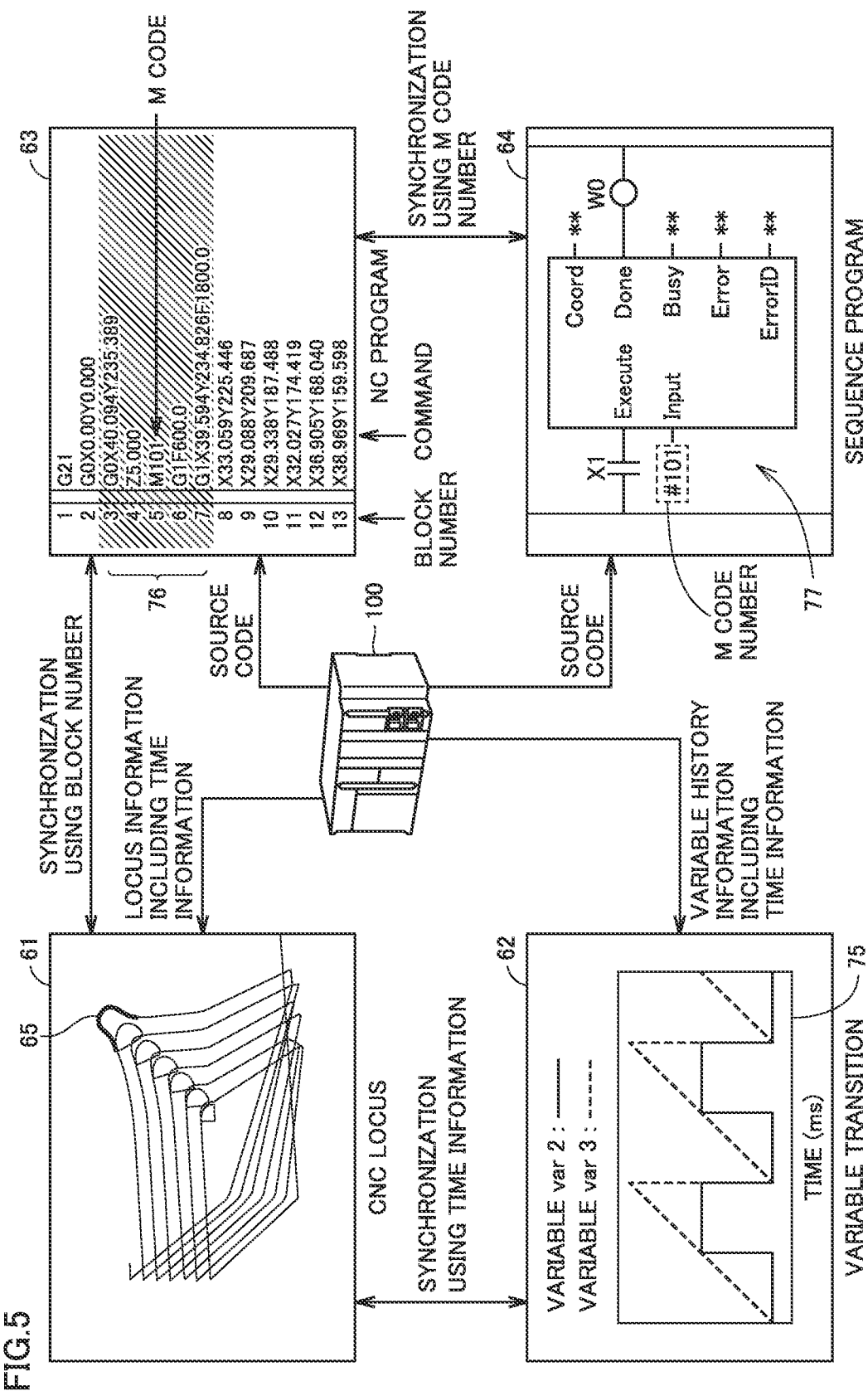
FIG. 5 is a view illustrating an outline of support screen generation processing performed by a support device.

FIG. 5 is a view illustrating an outline of support screen generation processing performed by the support device. Support device 200 acquires variable history information 34 and locus information 36 from control device 100. The support screen includes a window 61 displaying the locus indicated by acquired locus information 36, and a window 62 displaying the transition of the value of the variable indicated by variable history information 34. For example, the transition of the value of the variable is expressed using a graph.

Support device 200 selects the target period according to the operation by the designer. For example, support device 200 may accept the input of a part of a section (designated section) of the locus displayed in window 61, and select the period corresponding to the designated section as the target period. Alternatively, support device 200 may accept the input of a part of the period (designated period) in the graph displayed in window 62, and select the designated period as the target period.

When the target period is selected, support device 200 displays a first target portion 65 corresponding to the target period in the loci indicated by locus information 36 in the window 61. In the example of FIG. 5, support device 200 displays first target portion 65 in a display format different from another portions in window 61. Furthermore, support device 200 displays a second target portion 75 corresponding to the target period in the transition of the value of the variable indicated by variable history information 34 in window 62.

As described above, variable history information 34 and locus information 36 include the time information generated using common timer 101. For this reason, the time information included in variable history information 34 and the time information included in locus information 36 indicate the time on the same time axis. Accordingly, by checking first target portion 65 and second target portion 75 displayed in windows 61 and 62 respectively, the designer can easily check the relationship between the operations of machine tool 540 and conveyance device 550 during the target period. As a result, the debugging efficiency of the NC program and the sequence program, which control the machine tool and the target instrument around the machine tool that operate in cooperation with each other, is improved.

Support device 200 may include a window 63 displaying the source code of NC program 32 in the support screen.

In window 63, support device 200 displays a third target portion 76 of NC program 32 executed during the target period. In window 63 of FIG. 5, the source code (the source codes of block numbers "3" to "7") of third target portion 76 is displayed in the display format different from the source code of other portions. Consequently, the designer easily checks the debugging of the NC program.

Support device 200 may include a window 64 displaying the source code of sequence program 30 in the support screen.

Support device 200 may display the source code of a fourth target portion 77 related to a signal in sequence program 30 in window 64 in response to the fact that the source code of third target portion 76 executed in the target period in NC program 32 includes the command outputting the signal to sequence controller 10.

An M code number prescribing the external signal output by the execution of NC program 32 may be described in the parameter included in the source code of sequence program 30. For this reason, support device 200 may extract the source code including the M code number from sequence program 30 in response to the fact that the M code number is included in the source code of third target portion 76 executed in the target period in NC program 32. The source code including the M code number is related to the signal output from NC controller 11 to sequence controller 10.

The source code of fourth target portion 77 including a M code number "101" described in block number "5" of NC program 32 in sequence program 30 is displayed in window 64 of FIG. 5. Consequently, the designer easily debugs sequence program 30.

§ 2 Specific Example

A specific example of control system 1 of the embodiment will be described.

<2-A. Hardware Configuration Example of Control Device>

Figure 6:
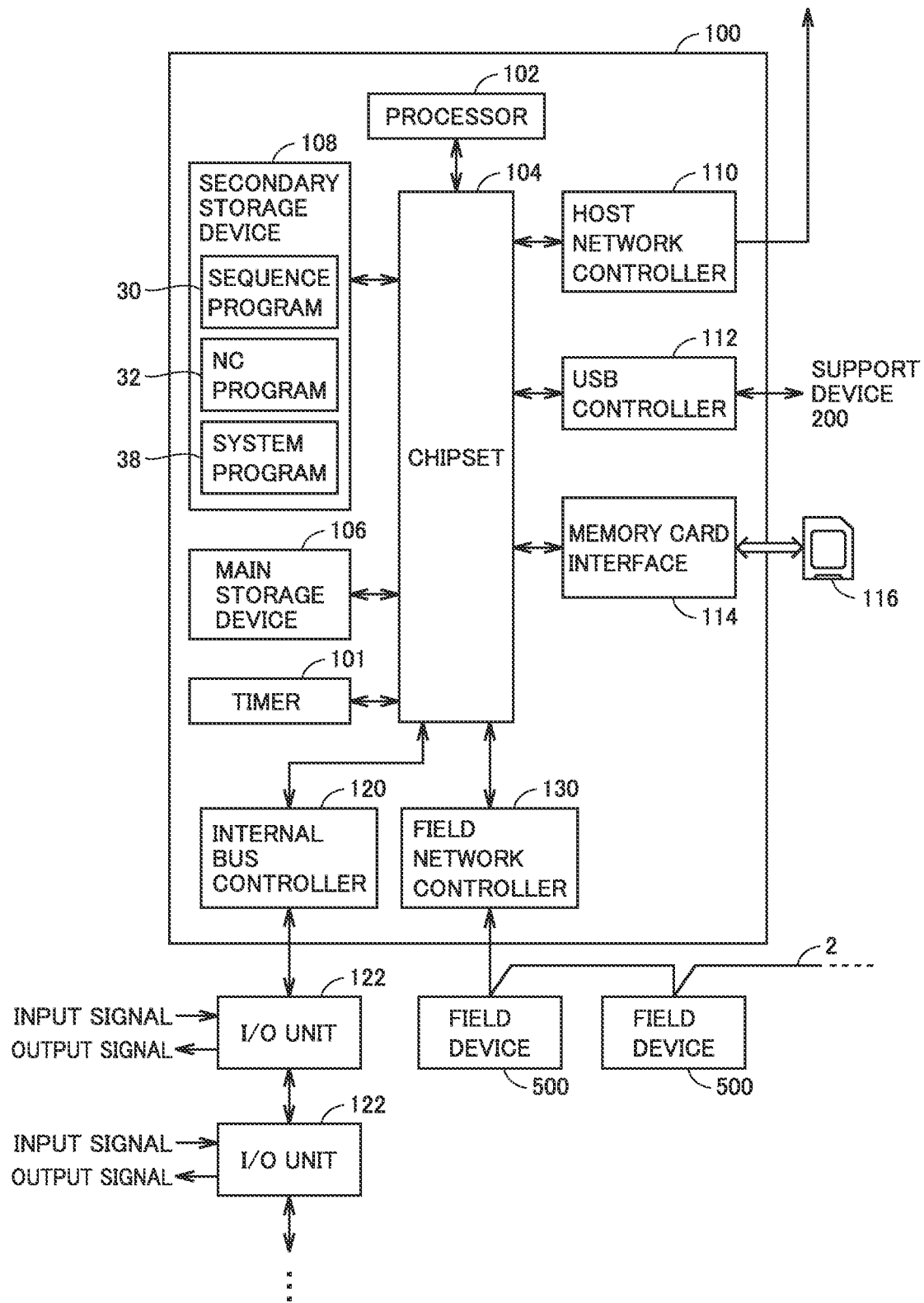
FIG. 6 is a block diagram illustrating a hardware configuration example of the control device included in the control system of the embodiment.

FIG. 6 is a block diagram illustrating a hardware configuration example of the control device included in the control system of the embodiment. As illustrated in FIG. 6, control device 100 is an arithmetic processing unit called a CPU unit, and include a processor 102, a chipset 104, a main storage device 106, a secondary storage device 108, a host network controller 110, a universal serial bus (USB) controller 112, a memory card interface 114, an internal bus controller 120, a field network controller 130, and timer 101.

Processor 102 is configured of a central processing unit (CPU), a micro processing unit (MPU), a graphics processing unit (GPU), and the like. As processor 102, a configuration including a plurality of cores may be adopted, or a plurality of processors 102 may be disposed. Chipset 104 implements the processing of control device 100 as a whole by controlling processor 102 and a peripheral element. Main storage device 106 is configured of a volatile storage device such as a dynamic random access memory (DRAM) and a static random access memory (SRAM). Secondary storage device 108 is configured of a nonvolatile storage device such as a hard disk drive (HDD) and a solid state drive (SSD).

Processor 102 reads various programs stored in secondary storage device 108, expands the various programs in main storage device 106, and executes the various programs to implement the control according to the control target and various pieces of processing as described later. In addition to system program 38 implementing the basic functions, a user program (sequence program 30 and NC program 32) produced according to the manufacturing device and facility of the control target is stored in secondary storage device 108.

Host network controller 110 controls the data exchange with a server device (not illustrated) or the like through a host network. USB controller 112 controls the data exchange with support device 200 through USB connection.

Memory card interface 114 is configured such that a memory card 116 is detachably attached, and memory card interface 114 can write the data in memory card 116 and read various data (user programs, trace data, and the like) from memory card 116.

Internal bus controller 120 controls the data exchange with I/O unit 122 mounted on control device 100. Field network controller 130 controls the data exchange with field device 500 through field network 2.

For example, timer 101 is a counter that is incremented or decremented according to a time lapse.

Although the configuration example in which the required functions are provided by processor 102 executing the program has been illustrated in FIG. 6, some or all of these provided functions may be mounted using a dedicated hardware circuit (for example, ASIC or FPGA). Alternatively, a main part of control device 100 may be implemented using hardware (for example, an industrial personal computer based on a general-purpose personal computer) according to a general-purpose architecture. In this case, a plurality of operating systems (OSs) having different uses may be executed in parallel using a virtualization technology, and the required application may be executed on each OS.

In control system 1 of FIG. 6, control device 100 and support device 200 are configured as separate bodies, but a configuration in which all or a part of these functions is integrated into a single device may be adopted.

<2-B. Hardware Configuration Example of Support Device>

Figure 7:
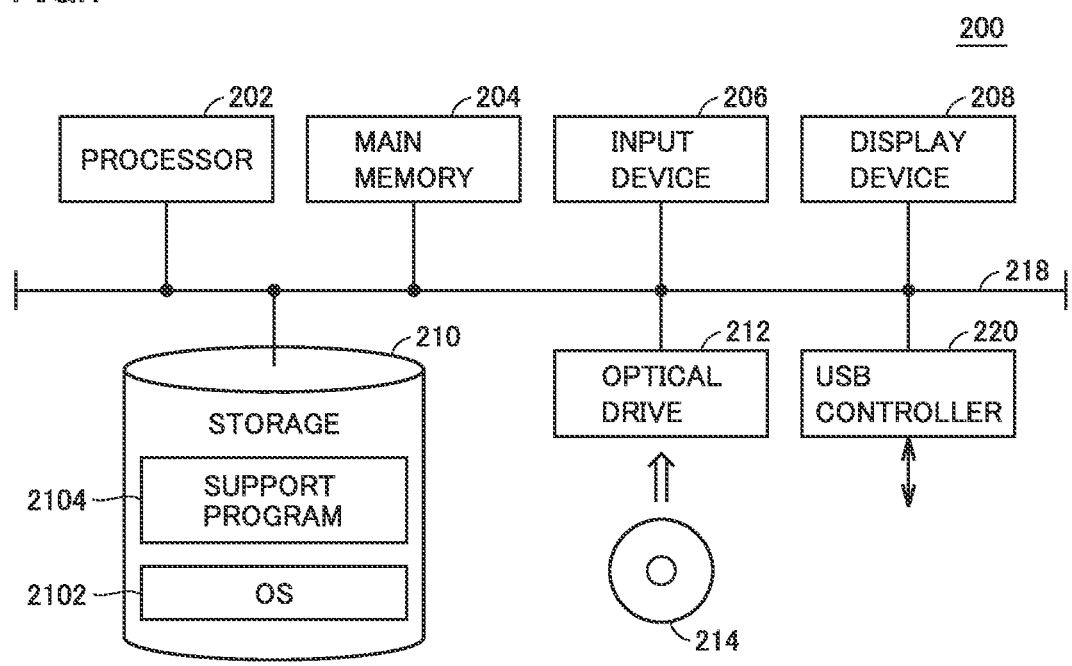
FIG. 7 is a schematic diagram illustrating a hardware configuration example of the support device included in the control system of the embodiment.

FIG. 7 is a schematic diagram illustrating a hardware configuration example of the support device included in the control system of the embodiment. For example, support device 200 is implemented using hardware (for example, a general-purpose personal computer) according to a general-purpose architecture.

As illustrated in FIG. 7, support device 200 includes a processor 202, a main memory 204, an input device 206, a display device 208, a storage 210, an optical drive 212, and a USB controller 220. These components are connected to each other through a processor bus 218.

Processor 202 is configured of a CPU, a GPU, and the like, and reads a program (as an example, an OS 2102 and a support program 2104) stored in storage 210, expands the program in main memory 204, and executes the program, thereby implementing various pieces of processing for control system 1.

Main memory 204 is configured of a volatile storage device such as a DRAM or an SRAM. For example, storage 210 includes a non-volatile storage device such as an HDD or an SSD.

In addition to OS 2102 implementing the basic function, support program 2104 providing the function as support device 200 is stored in storage 210. That is, support program 2104 is executed by a computer connected to control device 100, thereby implementing support device 200 of the embodiment.

Input device 206 is configured of a keyboard, a mouse, and the like, and receives a user operation. Display device 208 displays a processing result and the like from processor 202.

USB controller 220 exchanges the data with control device 100 and the like through the USB connection.

Support device 200 includes optical drive 212, and a program stored in a recording medium 214 (for example, an optical recording medium such as a digital versatile disc (DVD)) in which a computer-readable program is non-transiently stored is read and installed in storage 210 or the like.

Support program 2104 and the like executed by support device 200 may be installed through computer-readable recording medium 214, or installed by being downloaded from the server device or the like on the network. Sometimes the functions provided by support device 200 of the embodiment are implemented using a part of modules provided by the OS.

Although the configuration example in which the required functions as support device 200 are provided by processor 202 executing the program has been described in FIG. 7, some or all of these provided functions may be mounted using a dedicated hardware circuit (for example, ASIC or FPGA).

<2-C. Variable History Information>

Figure 8:
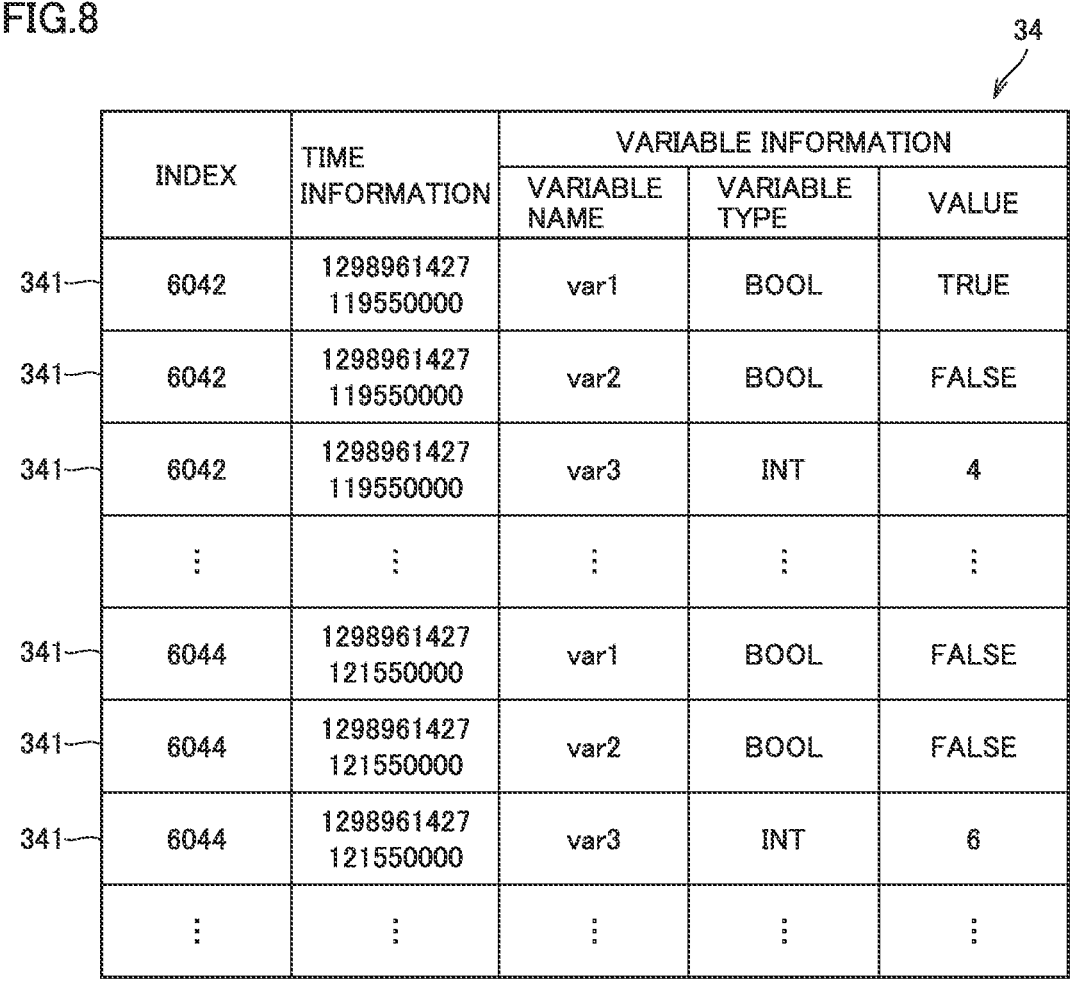
FIG. 8 is a view illustrating an example of variable history information.

FIG. 8 is a view illustrating an example of the variable history information. As described above, variable history information 34 is generated by variable management unit 13 (see FIG. 2) of control device 100.

Variable history information 34 in FIG. 8 is a set of elements 341. Element 341 is information in which an index identifying the control period in which the variable is updated, time information indicating the time of the control period, and variable information are associated with one another. The variable information includes a variable name, a variable type, and a value of the variable. The index is a continuous number. For example, the time information is a start time, an end time, or a time (instruction start time) designated by the user in the corresponding control period. The time information is generated using timer 101, and indicates, for example, a count value of timer 101.

Variable management unit 13 generates element 341 in each control period for each variable updated by the execution of sequence program 30, and adds generated element 341 to variable history information 34.

<2-D. Locus Information>

Figure 9:
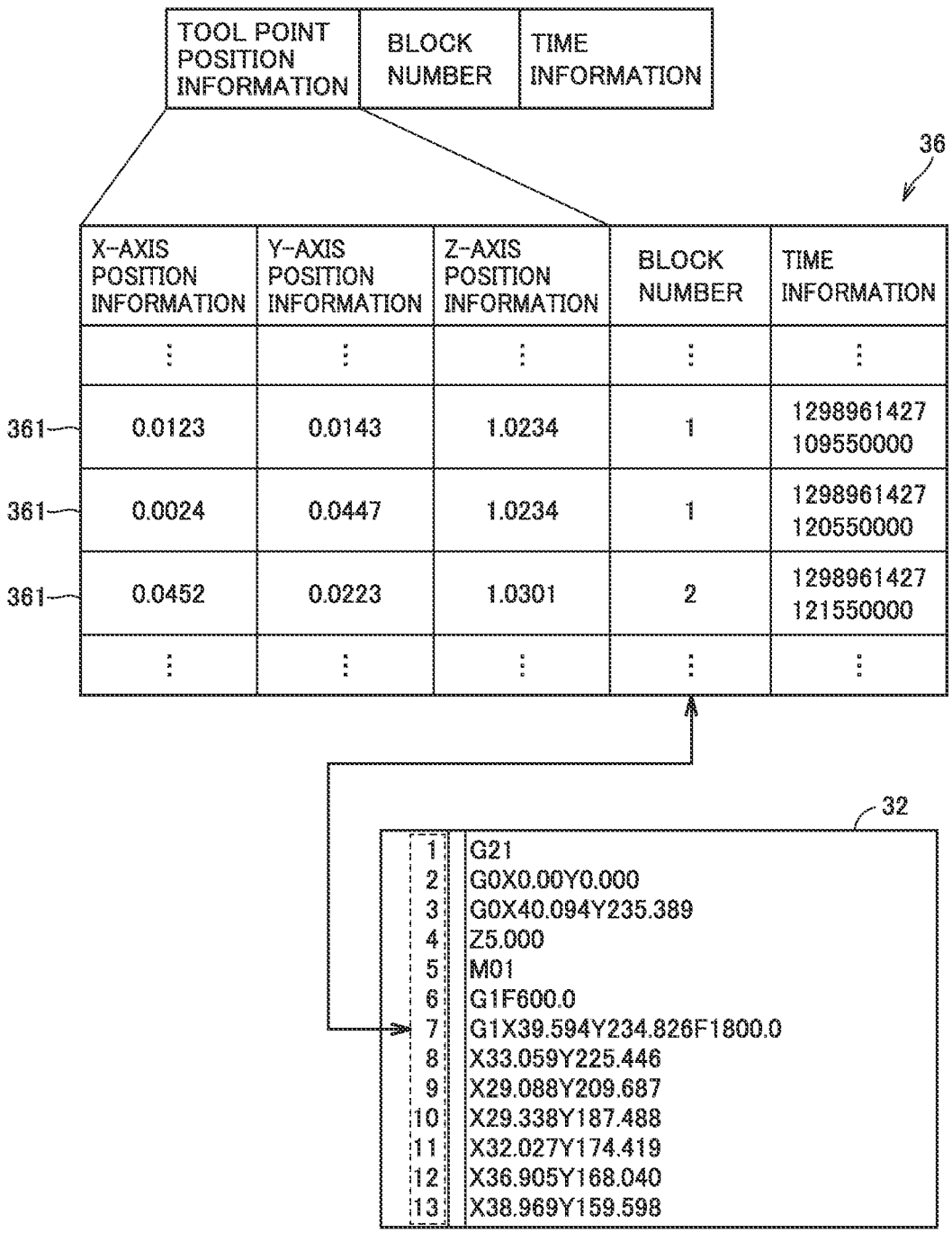
FIG. 9 is a view illustrating an example of locus information.

FIG. 9 is a view illustrating an example of the locus information. As described above, locus information 36 is generated by NC instruction value arithmetic unit 15 (see FIG. 2) of control device 100.

Locus information 36 exemplified in FIG. 9 includes an element 361 for each control period. Element 361 is information in which the position information about tool 541 (see FIG. 1) (hereinafter referred to as "tool point position information"), the block number, and the time information are associated with one another.

The tool point position information indicates the position of tool 541 corresponding to instruction value 17 of the corresponding control period. The tool point position information includes an X-axis position coordinate, a Y-axis position coordinate, and a Z-axis position coordinate. NC instruction value arithmetic unit 15 generates the tool point position information based on instruction value 17 (the position instruction value or the speed instruction value). As described with reference to FIGS. 3 and 4, instruction value 17 is calculated according to the intermediate code generated by sequentially interpreting each line (block) of NC program 32. NC instruction value arithmetic unit 15 generates an element 361, in which the tool point position information generated based on instruction value 17, the block number corresponding to the intermediate code used for the calculation of instruction value 17, and the time information indicating the control time in which instruction value 17 is used are associated with one another, in each control period. For example, the control time is a start time, an end time, or a time (command start time) designated by the user in the corresponding control period. NC instruction value arithmetic unit 15 adds generated element 361 to locus information 36. The time information is generated using timer 101, and indicates, for example, the count value of timer 101.

The time of the plurality of control periods can be input to the intermediate code (for example, function F1(t) in FIG. 4) generated by interpreting one line (block) of NC program 32. Accordingly, a plurality of elements 361 including the same block number can be continuous in locus information 36.

NC program 32 can also include a line (block) that prescribes the M code and a line (block) that prescribes stop or wait. The intermediate code generated by interpreting such lines (blocks) indicates that the position of tool 541 is constant. Accordingly, the plurality of elements 361 including the same tool point position information can be continuous in locus information 36.

<2-E. Functional Configuration Example of Support Device>

Figure 10:
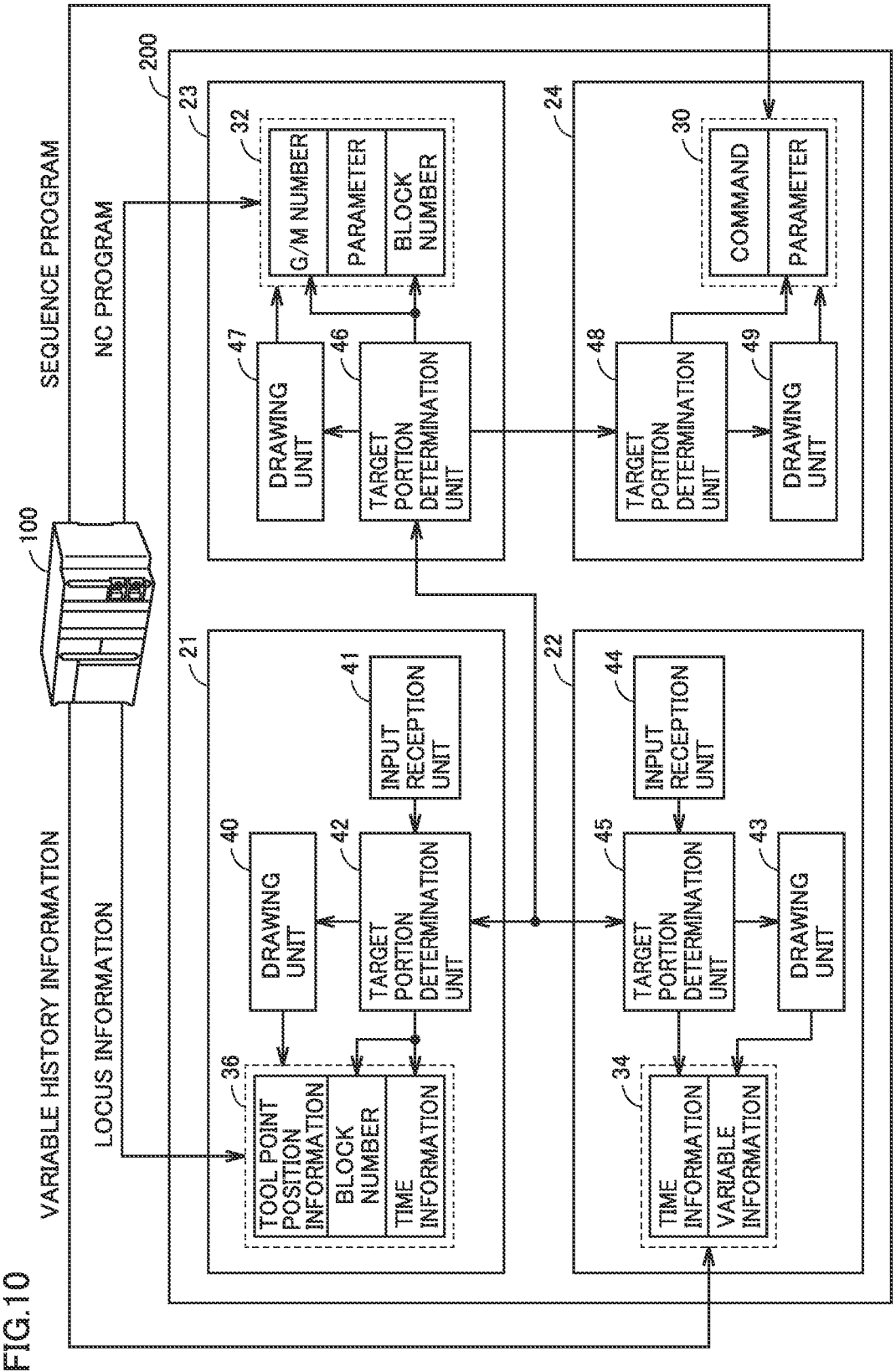
FIG. 10 is a view illustrating a functional configuration example of the support device.

FIG. 10 is a view illustrating a functional configuration example of the support device. FIG. 10 illustrates the configuration related to the function that assists the debugging of sequence program 30 and NC program 32 that are executed on control device 100. As illustrated in FIG. 10, support device 200 includes a first analysis unit 21, a second analysis unit 22, a third analysis unit 23, and a fourth analysis unit 24.

(2-E-1. First Analysis Unit)

First analysis unit 21 acquires locus information 36 from control device 100 and executes analysis processing for locus information 36. First analysis unit 21 includes a drawing unit 40, an input reception unit 41, and a target portion determination unit 42.

Drawing unit 40 displays the locus indicated by locus information 36 on display device 208 (see FIG. 7). Specifically, drawing unit 40 generates line segment information based on locus information 36, and draws the locus according to the line segment information.

FIG. 11 is a view illustrating an example of the line segment information. Line segment information 37 in FIG. 11 includes an element 371 for each line segment. Element 371 is information in which a line segment object ID, a start point of the line segment, an end point of the line segment, and the block number are associated with one another. Drawing unit 40 generates one element 371 using two consecutive elements 361 (see FIG. 9) in locus information 36. Specifically, drawing unit 40 generates an element 371 when the tool point position information indicated by first element 361 having the old time in two consecutive elements 361 in locus information 36 is set to the start point while the tool point position information indicated by second element 361 having the new time is set to the end point. Drawing unit 40 includes the block number of second element 361 in element 371. Furthermore, drawing unit 40 includes unique line segment object ID in element 371. Drawing unit 40 generates element 371 for each of all combinations of two consecutive elements 361 in locus information 36. In this way, line segment information 37 is generated.

As described above, a plurality of elements 361 including the same tool point position information can be continuous in locus information 36. For this reason, element 371 in which the start point and the end point are matched with each other can be included in line segment information 37. The line segment corresponding to element 371 becomes a point. For this reason, in the present specification, the "line segment" can also include the "point".

Drawing unit 40 displays a virtual space on display device 208. Drawing unit 40 disposes the line segment connecting the start point and the end point on the virtual space for each of all elements 371 included in line segment information 37. The line in which the line segments corresponding to all elements 371 included in line segment information 37 are connected in order indicates the locus indicated by locus information 36. Thus, the designer can recognize the locus of tool 541 in executing NC program 32 by checking display device 208.

Input reception unit 41 receives the input of the designated section of the locus displayed on display device 208. The designated section contains one or a plurality of consecutive line segments.

Figure 12:
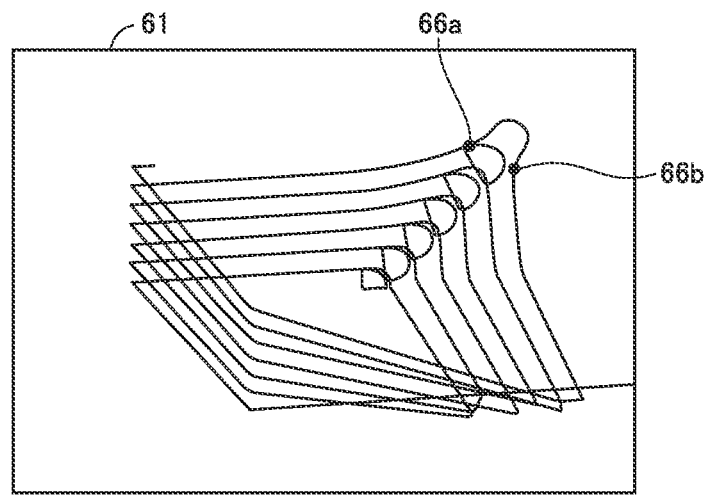
FIG. 12 is a view illustrating an example of a window that accepts input of a designated section.

FIG. 12 is a view illustrating an example of a window that accepts the input of the designated section. Window 61 in FIG. 12 includes two points 66a, 66b on the locus. Input reception unit 41 receives the section from point 66a to point 66b as the designated section. The positions of points 66a, 66b are variable depending on the operation onto input device 206 (see FIG. 7). Consequently, the designer may change the positions of points 66a, 66b such that points 66a, 66b are included in the desired line segment.

The method for inputting the designated section is not limited to the example illustrated in FIG. 12. For example, input reception unit 41 may receive a click at an arbitrary point on the locus. In this case, input reception unit 41 may determine the line segment including the clicked point as the designated section. Alternatively, input reception unit 41 may determine all the line segments corresponding to the same block number as the block number corresponding to the line segment including the clicked point as the designated section. Thus, the user can designate the designated section in units of blocks of NC program 32.

Target portion determination unit 42 determines the first target portion that is a highlighting target in the locus indicated by locus information 36. Target portion determination unit 42 determines the portion corresponding to the target period in the locus indicated by locus information 36 as the first target portion. Target portion determination unit 42 outputs line segment object ID corresponding to the first target portion to drawing unit 40. Drawing unit 40 displays the line segment (first target portion) of line segment object ID received from target portion determining unit 42 in the display format different from that of other line segments. For example, the first target portion is displayed with a thicker line than the other portions. Alternatively, the first target portion may be displayed in a color (for example, red) different from that of other portions (for example, black).

Target portion determination unit 42 determines the first target portion according to one of the following two methods (a), (b).

Method (a): When the designated section is received from input reception unit 41, target portion determination unit 42 determines all the line segments included in the designated section as the first target portion.

Method (b): When the target period information indicating the target period is received from second analysis unit 22, target portion determination unit 42 extracts all elements 361 including the time information included in the target period from locus information 36. Target portion determination unit 42 extracts, from line segment information 37, element 371 including the end point and the block number which are matched with the tool point position information and the block number included in element 361 extracted from locus information 36. Target portion determination unit 42 determines the line segment of line segment object ID of element 371 extracted from line segment information 37 as the first target portion.

Furthermore, when input reception unit 41 receives the designated section, target portion determination unit 42 selects the period corresponding to the designated section as the target period. Specifically, target portion determination unit 42 extracts element 371 corresponding to all the line segments included in the designated section from line segment information 37. Target portion determination unit 42 extracts, from the locus information 36, element 361 including the tool point position information and the block number which are matched with the end point and the block number included in extracted element 371. Target portion determination unit 42 determines the target period based on the time information included in extracted element 361.

When extracting the plurality of consecutive elements 361 from locus information 36, target portion determination unit 42 determines the period from the time of the time information included in first element 361 of the plurality of elements 361 to the time of the time information included in last element 361 as the target period. When extracting only one element 361 from locus information 36, target portion determination unit 42 determines the time of the time information included in extracted element 361 as the target period.

In this way, input reception unit 41 and target portion determination unit 42 operate as a selection unit that receives the input of the designated section in the loci displayed on display device 208 and selects the period corresponding to the designated section based on locus information 36 as the target period.

Target position determination unit 42 outputs the target period information indicating the target period to second analysis unit 22 according to the selection of the target period.

Furthermore, target portion determination unit 42 extracts element 361 having the time information belonging to the target period from locus information 36 according to the selection of the target period, and outputs the block number included in extracted element 361 to third analysis unit 23. In response to the reception of the target period information from second analysis unit 22, target portion determination unit 42 extracts element 361 having the time information belonging to the target period indicated by the target period information from locus information 36, and outputs the block number included in element 361 to third analysis unit 23. The block number output from target portion determination unit 42 to third analysis unit 23 corresponds to the portion of NC program 32 executed during the target period.

(2-E-2. Second Analysis Unit)

Second analysis unit 22 acquires variable history information 34 from control device 100 and executes analysis processing for variable history information 34. The type of the variable that is analysis target is previously set by a setter. For this reason, second analysis unit 22 may acquire variable history information 34 corresponding to the variable of the previously-set type from control device 100. Second analysis unit 22 includes a drawing unit 43, an input reception unit 44, and a target portion determination unit 45.

Drawing unit 43 displays the value of the variable indicated by variable history information 34 on display device 208 (see FIG. 7). For example, drawing unit 43 displays the graph illustrating the transition of the value of the variable on display device 208.

Input reception unit 44 receives the input of the designated period in the transition of the value of the variable displayed on display device 208.

Figure 13:
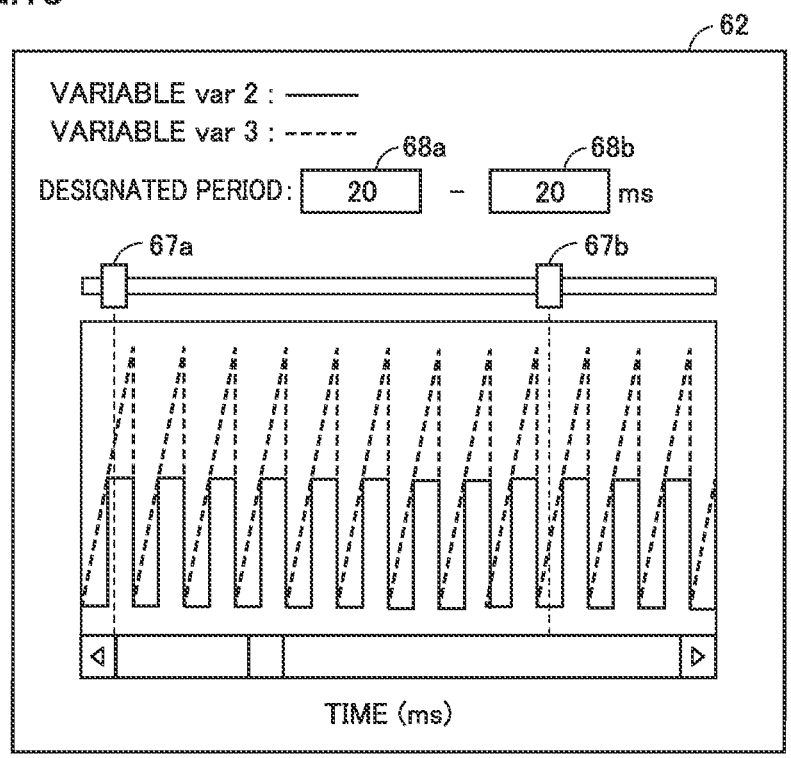
FIG. 13 is a view illustrating an example of a window illustrating transition of a variable value.

FIG. 13 is a view illustrating an example of a window illustrating a change in variable value. Window 62 in FIG. 13 includes sliders 67a, 67b setting the start time and the end time of the designated period. Furthermore, window 62 includes input fields 68a, 68b in which the times of sliders 67a, 67b are input. Input reception unit 44 receives the input for the designated period using sliders 67a, 67b or input fields 68a, 68b.

Target portion determination unit 45 determines the second target portion that is the display target (or the highlighting target) in the transition of the value of the variable indicated by variable history information 34. Target portion determination unit 45 determines the portion corresponding to the target period in the transition of the value of the variable indicated by variable history information 34 as the second target portion. For example, the second target portion is specified by one or a plurality of consecutive indexes (see FIG. 7) included in variable history information 34. Target portion determination unit 45 outputs the index specifying the determined second target portion to drawing unit 43. The drawing unit 43 displays only the value of the variable corresponding to the index received from target portion determination unit 45 in the window 62. Alternatively, drawing unit 43 displays the value of the variable corresponding to the index received from target portion determination unit 45 in the display format different from the value of the variable corresponding to another index.

Target portion determination unit 42 determines the second target portion according to one of the following two methods (A), (B).

Method (A): When input reception unit 44 receives the input of the designated period, target portion determination unit 45 determines the index corresponding to the start time of the designated period to the index corresponding to the end time of the designated period as the second target portion.

Method (B): When the target period information is received from first analysis unit 21, target portion determination unit 45 determines the index corresponding to the time information belonging to the target period indicated by the target period information as the second target portion.

Furthermore, when input reception unit 44 receives the input of the designated period, target portion determination unit 45 selects the designated period as the target period. In this way, input reception unit 44 and target portion determination unit 45 operate as the selection unit that receives the input of the designated period in the transitions of the values of the variables displayed on display device 208 and selects the designated period as the target period. Target portion determination unit 42 outputs the target period information indicating the target period to first analysis unit 21 according to the selection of the target period.

(2-E-3. Third Analysis Unit)

Third analysis unit 23 acquires the source code of NC program 32 from control device 100, and performs the analysis processing on NC program 32. The source code of NC program 32 includes the block number, the G code number or the M code number, and the parameter for each line (block) as described above. Third analysis unit 23 includes a target portion determination unit 46 and a drawing unit 47.

Target portion determination unit 46 determines the third target portion that is the display target (or the highlighting target) in NC program 32. Target portion determination unit 46 determines the portion of NC program 32 executed during the target period as the third target portion. Specifically, target portion determination unit 46 determines the line (block) of the block number received from first analysis unit 21 as the third target portion. As described above, the block number output from target portion determination unit 42 of first analysis unit 21 to third analysis unit 23 is the portion of NC program 32 executed during the target period.

When the M code number is included in the third target portion, target portion determination unit 46 outputs the M code number to fourth analysis unit 24.

Drawing unit 47 displays the source code of the third target portion determined by target portion determination unit 46 on display device 208. Drawing unit 47 may display only the source code of the third target portion on display device 208. Alternatively, drawing unit 47 may display the source code of the third target portion and the source codes of the block numbers above and below the third target portion on display device 208, and display the source code of the third target portion in the display format different from other source codes.

Thus, the designer can easily check the source code of the third target portion of NC program 32 executed during the target period.

(2-E-4. Fourth Analysis Unit)

Fourth analysis unit 24 acquires the source code of sequence program 30 from control device 100 and performs analysis processing on sequence program 30. The source code of sequence program 30 includes the LD/ST command and the parameter as described above. Fourth analysis unit 24 includes a target portion determination unit 48 and a drawing unit 49.

Target portion determination unit 48 determines the fourth target portion that is the display target (or the highlighting target) in sequence program 30. Target portion determination unit 48 determines the portion including the M code number received from third analysis unit 23 in sequence program 30 as the fourth target portion. As described above, target portion determination unit 46 of third analysis unit 23 outputs the M code number included in the third target portion executed in the target period of NC program 32 to fourth analysis unit 24. The M code number includes the number corresponding to the command (function) that outputs the signal to the outside. Accordingly, the fourth target portion determined by target portion determination unit 48 is the portion of sequence program 30 related to the signal output from NC controller 11 during the target period.

Drawing unit 49 displays the source code of the fourth target portion determined by target portion determination unit 48 on display device 208. Drawing unit 49 may display only the source code of the fourth target portion on display device 208. Alternatively, drawing unit 49 may display the source code of the fourth target portion and the source code above and below the fourth target portion on display device 208, and display the source code of the fourth target portion in the display format different from other source codes.

Thus, the designer can easily check the source code of the fourth target portion related to the signal output from NC controller 11 during the target period of sequence program 30.

<2-F. Processing Flow of Support Device when Target Period is Selected from Locus>

Figure 14:
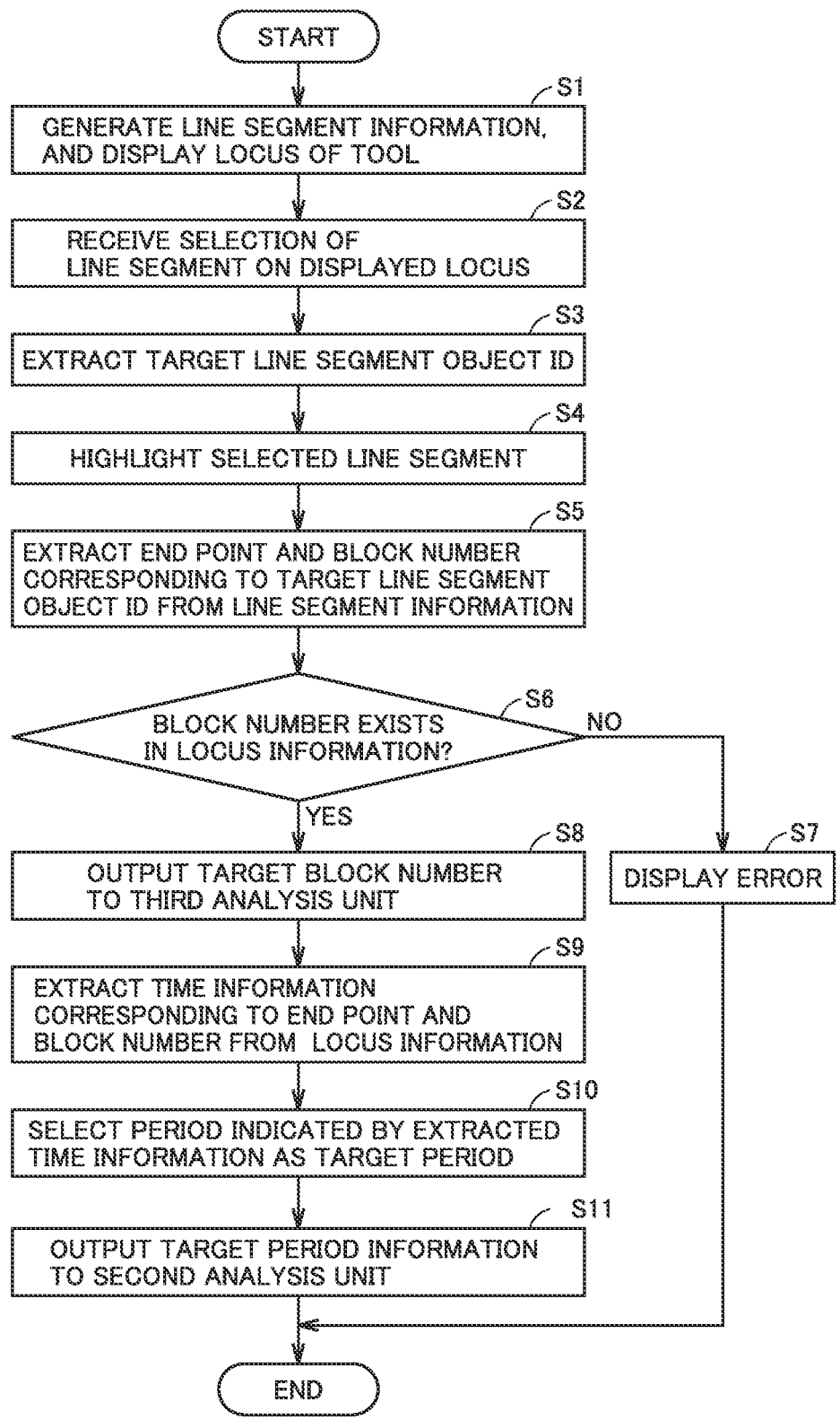
FIG. 14 is a flowchart illustrating an example of a processing flow in a first analysis unit when a target period is selected from a locus.
Figure 15:
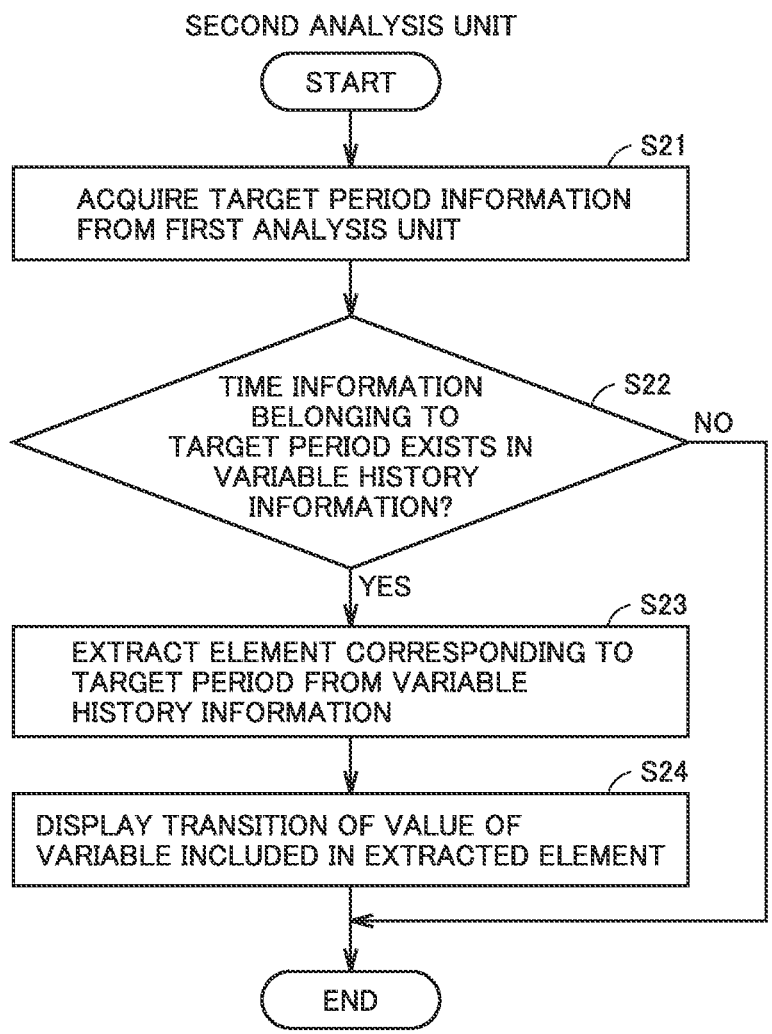
FIG. 15 is a flowchart illustrating an example of a processing flow in a second analysis unit when the target period is selected from the locus.
Figure 16:
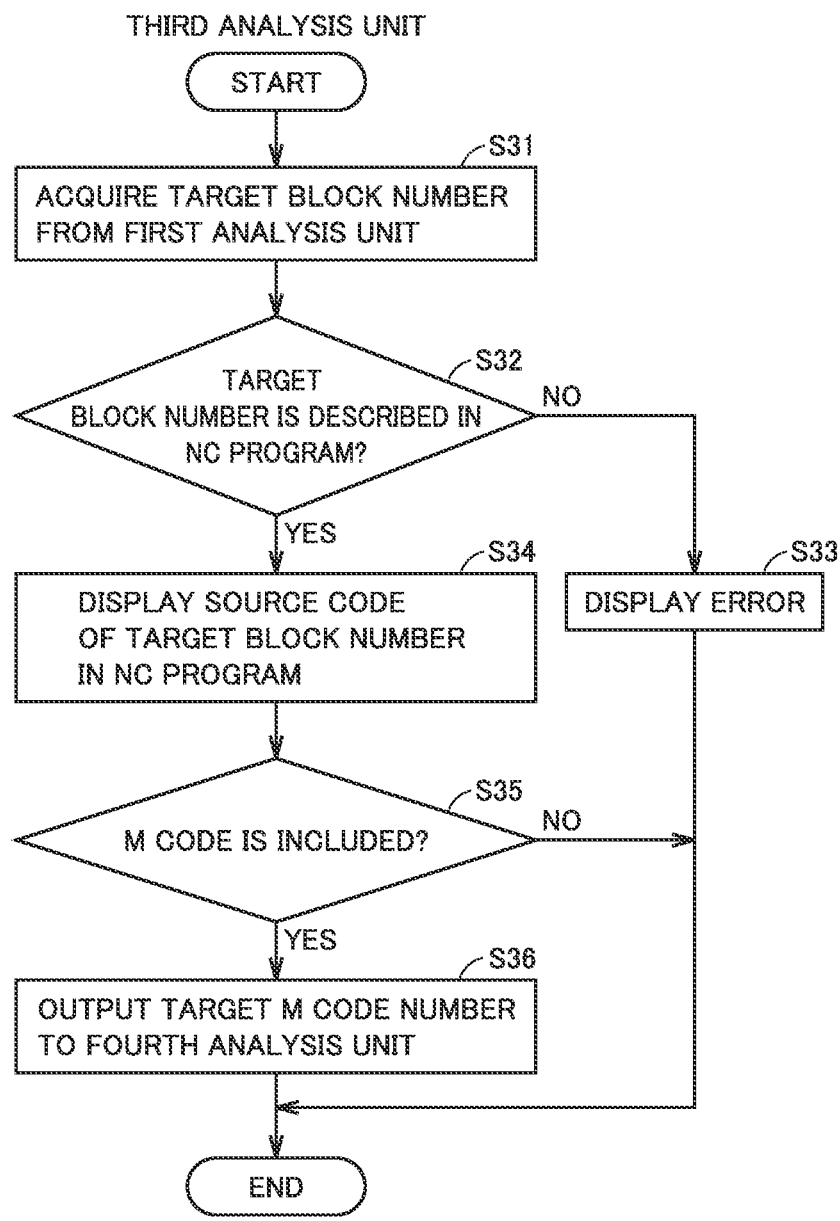
FIG. 16 is a flowchart illustrating an example of a processing flow in a third analysis unit.
Figure 17:
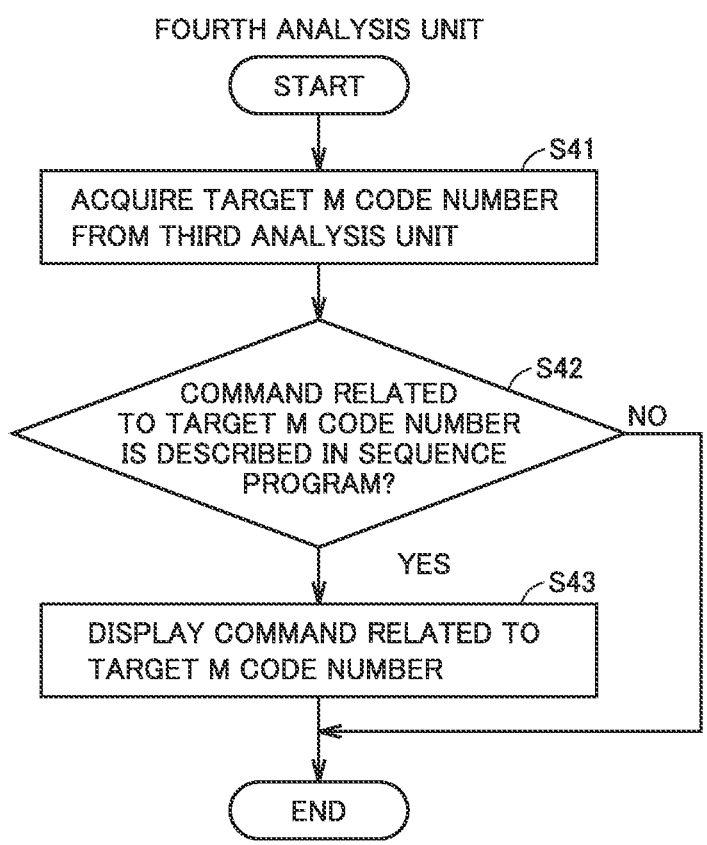
FIG. 17 is a flowchart illustrating an example of a processing flow in a fourth analysis unit.
Figure 18:
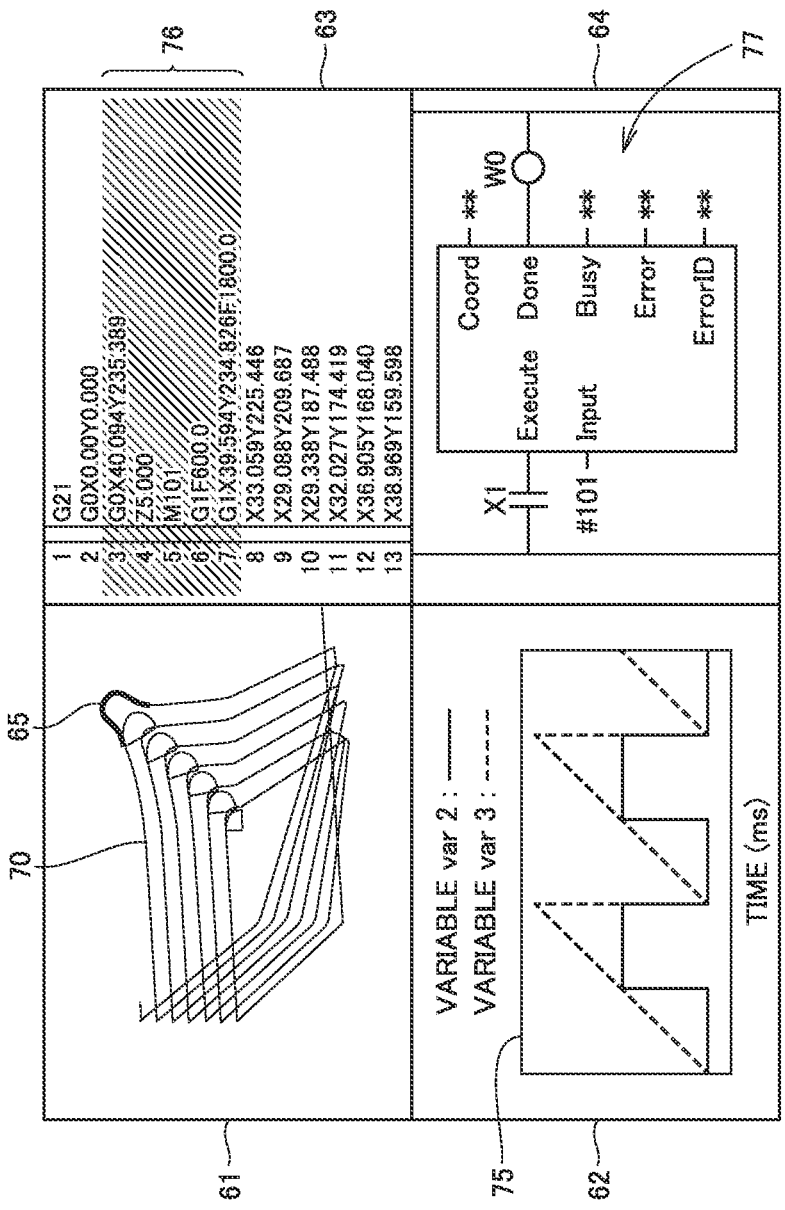
FIG. 18 is a view illustrating an example of a support screen displayed on a display device.

Referring to FIGS. 14 to 18, the processing flow in support device 200 when the target period is selected from the locus will be described. FIG. 14 is a flowchart illustrating an example of the processing flow in the first analysis unit when the target period is selected from the locus. FIG. 15 is a flowchart illustrating an example of the processing flow in the second analysis unit when the target period is selected from the locus. FIG. 16 is a flowchart illustrating an example of the processing flow in the third analysis unit. FIG. 17 is a flowchart illustrating an example of the processing flow in the fourth analysis unit. FIG. 18 is a view illustrating an example of the support screen displayed on the display device.

(2-F-1. Processing Flow of First Analysis Unit)

As illustrated in FIG. 14, first analysis unit 21 generates line segment information 37 from locus information 36, and displays the locus of tool 541 in the execution of NC program 32 according to line segment information 37 on display device 208 (step S1). As illustrated in FIG. 18, locus 70 of tool 541 is displayed in window 61 of display device 208.

Subsequently, first analysis unit 21 receives the selection of one or the plurality of continuous line segments on displayed locus 70 (step S2). First analysis unit 21 extracts line segment object ID of the selected line segment (hereinafter referred to as "target line segment object ID") from line segment information 37 (step S3). First analysis unit 21 highlights the line segment of target line segment object ID (that is, first target portion 65) (step S4). In the example of FIG. 17, first target portion 71 is displayed thicker than other line segments.

Subsequently, first analysis unit 21 extracts the end point and the block number corresponding to target line segment object ID from line segment information 37 (step S5).

Subsequently, first analysis unit 21 determines whether the block number extracted from line segment information 37 exists in locus information 36 (step S6). When the extracted block number does not exist in locus information 36 (NO in step S6), first analysis unit 21 displays an error message on display device 208 (step S7), and ends the processing. The error message indicates that locus information 36 is incomplete.

When the extracted block number exists in locus information 36 (YES in step S6), first analysis unit 21 outputs the extracted block number (hereinafter referred to as "target block number") to third analysis unit 23 (step S8). When the plurality of continuous line segments are selected in step S2 and when the plurality of block numbers are extracted in step S5, all of the plurality of block numbers are the target block numbers.

Subsequently, first analysis unit 21 extracts the time information about element 361 including the tool point position information and the block number that are matched with the end point and the block number extracted in step S5 from locus information 36 (step S9). First analysis unit 21 selects the target period based on the time information extracted in step S9 (step S10). First analysis unit 21 outputs the target period information indicating the selected target period to second analysis unit 22 (step S11). After step S11, first analysis unit 21 ends the processing.

(2-F-2. Processing Flow of Second Analysis Unit)

As illustrated in FIG. 15, second analysis unit 22 acquires the target period information from first analysis unit 21 (step S21). Second analysis unit 22 determines whether the time information belonging to the target period indicated by the target period information exists in variable history information 34 (step S12). When the time information belonging to the target period does not exist in variable history information 34 (NO in step S12), second analysis unit 22 ends the processing.

When the time information belonging to the target period exists in variable history information 34 (YES in step S12), second analysis unit 22 extracts element 341 (element 341 corresponding to the target period) including the time information belonging to the target period from variable history information 34 (step S23). Second analysis unit 22 displays the transition of the value of the variable included in extracted element 341 on display device 208 (step S24). Element 341 extracted in step S23 corresponds to the target period. For this reason, the transition displayed in step S24 is second target portion 75 corresponding to the target period in the transition of the value of the variable indicated by variable history information 34. As illustrated in FIG. 18, second target portion 75 is represented in a graph format in window 62. After step S24, second analysis unit 22 ends the processing.

In step S14, second analysis unit 22 may display the transition of the value of the variable of element 341 corresponding to not only the target period but also the period including before and after the target period on window 62. In this case, second analysis unit 22 displays second target portion 75 in the display format different from the values of the variables in other periods.

(2-F-3. Processing Flow of Third Analysis Unit)

As illustrated in FIG. 16, third analysis unit 23 acquires the target block number from first analysis unit 21 (step S31). Third analysis unit 23 determines whether the target block number is described in NC program 32 (step S32). When the target block number is not described in NC program 32 (NO in step S32), third analysis unit 23 displays an error message on display device 208 (step S33), and ends the processing. The error message indicates that NC program 32 does not include the block number that is presumed to be executed during the target period.

When the target block number is described in NC program 32 (YES in step S32), third analysis unit 23 displays the source code of the target block number in NC program 32 on display device 208 (step S34). The target block number corresponds to the source code executed in the target period. Accordingly, the source code displayed in step S34 is third target portion 76 of NC program 32 executed during the target period. As illustrated in FIG. 18, third target portion 76 is displayed in window 63 in the display format (shaded) different from other portions of NC program 32.

Third analysis unit 23 determines whether the source code of the target block number includes the M code number (step S35). When the source code of the target block number does not include the M code number (NO in step S35), third analysis unit 23 ends the processing. When the source code of the target block number includes the M code number (YES in step S25), third analysis unit 23 outputs the M code number (hereinafter, referred to as "target M code number") included in the source code of the target block number to fourth analysis unit 24 (step S36), and ends the processing.

(2-F-4. Processing Flow of Fourth Analysis Unit)

As illustrated in FIG. 17, fourth analysis unit 24 acquires the target M code number from third analysis unit 23 (step S41). Fourth analysis unit 24 determines whether the command related to the target M code number is described in sequence program 30 (step S42). When the command related to the target M code number is not described in sequence program 30 (NO in step S42), fourth analysis unit 24 ends the processing.

When the command related to the target M code number is described in sequence program 30 (YES in step S42), fourth analysis unit 24 displays the source code of the command related to the target M code number in sequence program 30 on display device 208 (step S43). The target M code number is included in the third target portion of NC program 32 executed in the target period. Accordingly, the source code displayed in step S43 becomes fourth target portion 77 that is the command related to the signal output to sequence controller 10 in sequence program 30. In the support screen of FIG. 18, the source code of fourth target portion 77 related to the target M code number is displayed in window 64.

In step S43, fourth analysis unit 24 may display not only fourth target portion 77 related to the target M code number but also the source codes of the commands before and after fourth target portion 77 in window 64. In this case, fourth analysis unit 24 displays the source code of fourth target portion 77 in the display format different from other source codes.

<2-G. Processing Flow of Support Device when Target Period is Selected from Variable History Information>

Figure 19:
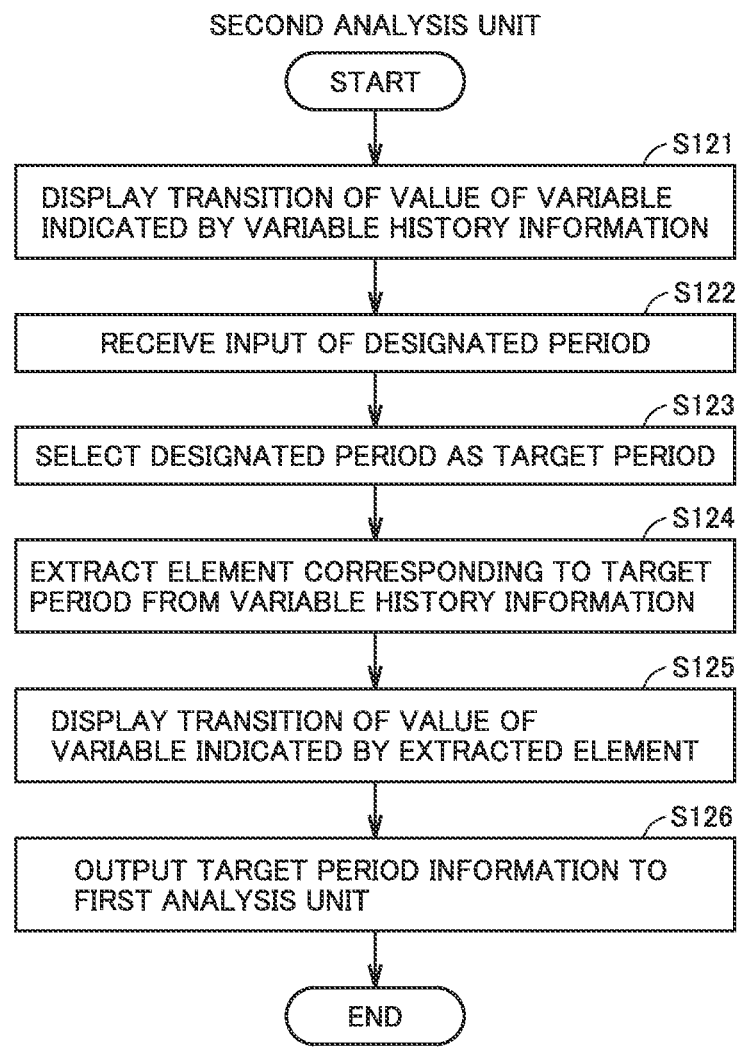
FIG. 19 is a flowchart illustrating an example of the processing flow in the second analysis unit when the target period is selected from the variable history information.
Figure 20:
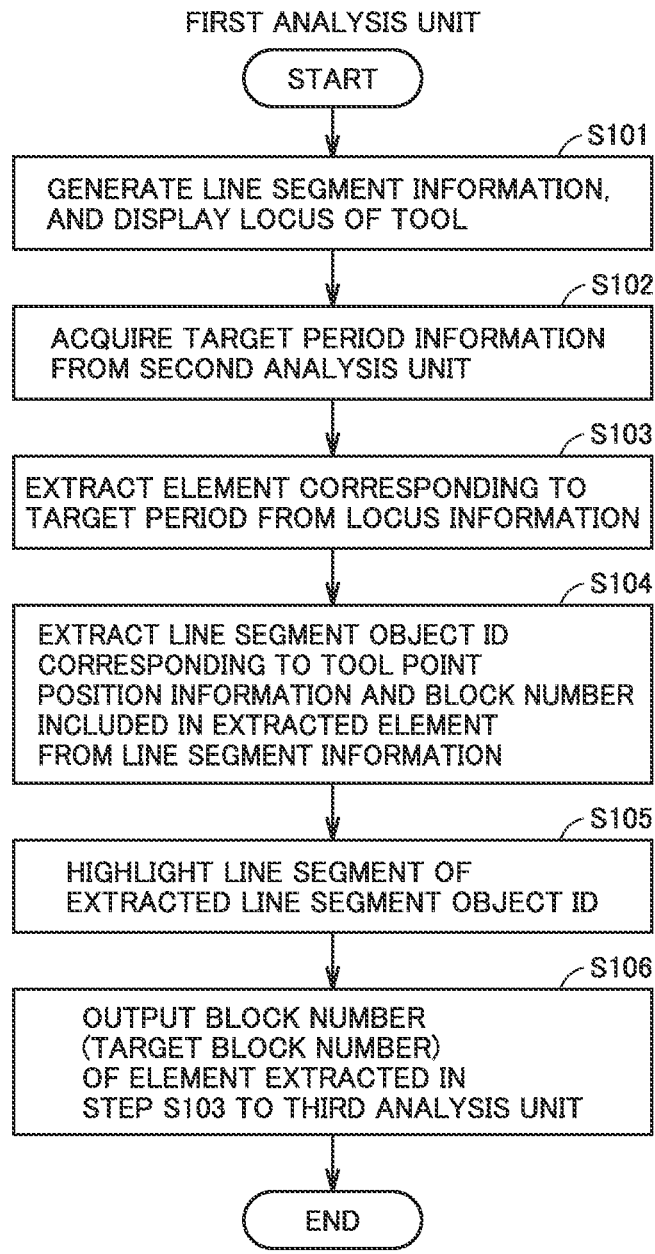
FIG. 20 is a flowchart illustrating an example of the processing flow in the first analysis unit when the target period is selected from the variable history information.

Referring to FIGS. 19 and 20, the processing flow in support device 200 when the target period is selected from variable history information 34 will be described. FIG. 19 is a flowchart illustrating an example of the processing flow in the second analysis unit when the target period is selected from the variable history information. FIG. 20 is a flowchart illustrating an example of the processing flow in the first analysis unit when the target period is selected from the variable history information. The processing flows of third analysis unit 23 and fourth analysis unit 24 when the target period is selected from variable history information 34 are the same as those of FIGS. 17 and 18, respectively. For this reason, the description of the processing flows of third analysis unit 23 and fourth analysis unit 24 will be omitted.

(2-G-1. Processing Flow of Second Analysis Unit)

As illustrated in FIG. 19, second analysis unit 22 displays the transition of the value of the variable indicated by variable history information 34 on display device 208 (step S121).

Subsequently, second analysis unit 22 receives the input of the designated period in the transitions of the values of the displayed variables (step S122). Second analysis unit 22 selects the input designated period as the target period (step S123).

Second analysis unit 22 extracts element 341 including the time information belonging to the target period (element 341 corresponding to the target period) from variable history information 34 (step S124). Second analysis unit 22 displays the value of the variable of extracted element 341 (the value of the variable corresponding to the target period) (step S125). That is, second analysis unit 22 displays the value of the variable corresponding to the target period in the display format different from the values of the variables corresponding to other periods. Alternatively, second analysis unit 22 may enlarge and display only the transition of the value of the variable corresponding to the target period.

Second analysis unit 22 outputs the target period information indicating the selected target period to first analysis unit 21 (step S126).

(2-G-2. Processing Flow of First Analysis Unit)

As illustrated in FIG. 20, first analysis unit 21 generates line segment information 37 from locus information 36, and displays the entire loci of tool 541 on display device 208 according to line segment information 37 (step S101).

First analysis unit 21 acquires the target period information from second analysis unit 22 (step S102). First analysis unit 21 extracts element 361 (element 361 corresponding to the target period) including the time information belonging to the target period indicated by the target period information from locus information 36 (step S103). First analysis unit 21 extracts line segment object ID corresponding to the end point and the block number which are matched with the tool point position information and the block number included in extracted element 361 from line segment information 37 (step S104). First analysis unit 21 highlights the line segment (that is, the first target portion) of line segment object ID extracted in step S104 (step S105).

Subsequently, first analysis unit 21 outputs the block number (target block number) of element 361 extracted in step S103 to third analysis unit 23 (step S1067).

<2-H. Action and Effect>

As described above, control system 1 includes NC controller 11 that controls CNC machine tool 540 according to NC program 32, sequence controller 10 that controls conveyance device 550 according to sequence program 30, and support device 200. NC controller 11 and sequence controller 10 are time-synchronized with each other. Support device 200 includes first analysis unit 21 and second analysis unit 22. First analysis unit 21 acquires locus information 36 in which the position of tool 541 corresponding to instruction value 17 generated by the execution of NC program 32 is associated with the first time information indicating the control time using the instruction value by NC controller 11. Second analysis unit 22 acquires variable history information 34 in which the value of the variable updated by the execution of sequence program 30 and the second time information indicating the update time are associated with each other. The first time information and the second time information are generated by NC controller 11 and sequence controller 10, respectively. Support device 200 further includes the selection unit that selects the target period in the execution periods of NC program 32 and sequence program 30. The selection unit is configured of input reception units 41, 44 and target portion determination units 42, 45. Support device 200 includes drawing units 40, 43. Drawing unit 40 displays the first target portion corresponding to the target period among the loci indicated by locus information 36 on display device 208. Drawing unit 43 displays the second target portion corresponding to the target period in the transition of the value of the variable indicated by variable history information 34 on display device 208.

According to the above configuration, the first time information included in locus information 36 and the second time information included in variable history information 34 are generated by NC controller 11 and sequence controller 10 that are time-synchronized with each other. For this reason, the first time information and the second time information indicate the time on the common time axis. Accordingly, the designer can easily check the relationship between the operations of CNC machine tool 540 and conveyance device 550 in the target period by checking the first target portion of the locus corresponding to the target period and the value of the variable in the target period using display device 208. As a result, the debugging efficiency of the NC program and the sequence program, which control the machine tool and the target instrument around the machine tool that operate in cooperation with each other, is improved.

Drawing unit 40 may display the locus indicated by locus information 36 on display device 208. Input reception unit 41 and target portion determination unit 42 may receive the input of the designated section in the loci displayed on display device 208 and select the period corresponding to the designated section as the target period based on the locus information 36. Drawing unit 40 displays the first target portion of the locus displayed on display device 208 in the display format different from the remaining portions.

Thus, the designer can designate the portion to be checked from the locus indicated by locus information 36 as the designated section. Because the period corresponding to the designated section is selected as the target period, the designated section is matched with the first target portion. The first target portion in the locus is displayed in the display format different from the remaining portion. Accordingly, the designer can easily check the relative position of the designated section (that is, the first target portion) with respect to the entire locus, and easily check the value of the variable updated in the period (target period) corresponding to the designated section.

Alternatively, drawing unit 43 may display the transition of the value of the variable indicated by variable history information 34 on display device 208. Input reception unit 44 and target portion determination unit 45 may receive the input of the designated period in the transitions displayed on display device 208, and select the designated period as the target period. Drawing unit 43 displays the second target portion corresponding to the target period in the transition displayed on display device 208 in the display format different from the remaining portion.

Accordingly, the designer can designate the period to be checked from the transition of the value of the variable indicated by variable history information 34 as the designated period. Because the designated period is selected as the target period, the portion in the locus corresponding to the designated period is the first target portion, and the first target portion is displayed on display device 208. Consequently, the designer can easily check the relationship between the transition of the value of the variable and the position of CNC machine tool 540 in the designated period.

Support device 200 further includes drawing unit 47 that displays the source code of the third target portion of NC program 32 executed in the target period on display device 208.

Accordingly, the designer can easily check the relationship between NC program 32 executed in the target period and the position of CNC machine tool 540 in the target period, and becomes easy to debug NC program 32.

When support device 200 further includes drawing unit 49 that displays the source code of the fourth target portion related to the signal in sequence program 30 on display device 208 in response to the fact that the command outputting the signal to sequence controller 10 is included in the third target portion of NC program 32.

Accordingly, the designer can easily check the source code of sequence program 30 related to the signal output according to NC program 32 in the target period, and becomes easy to debug sequence program 30.

NC controller 11 and sequence controller 10 are included in one control device 100, and operate according to common timer 101 included in control device 100. Accordingly, NC controller 11 and sequence controller 10 can be easily time-synchronized.

<2-I. Modifications>

(2-I-1. First Modification)

In the above description, it is assumed that control device 100 includes sequence controller 10 and NC controller 11. Accordingly, sequence controller 10 and NC controller 11 are time-synchronized using common timer 101. However, NC controller 11 may be separate from control device 100.

Figure 21:
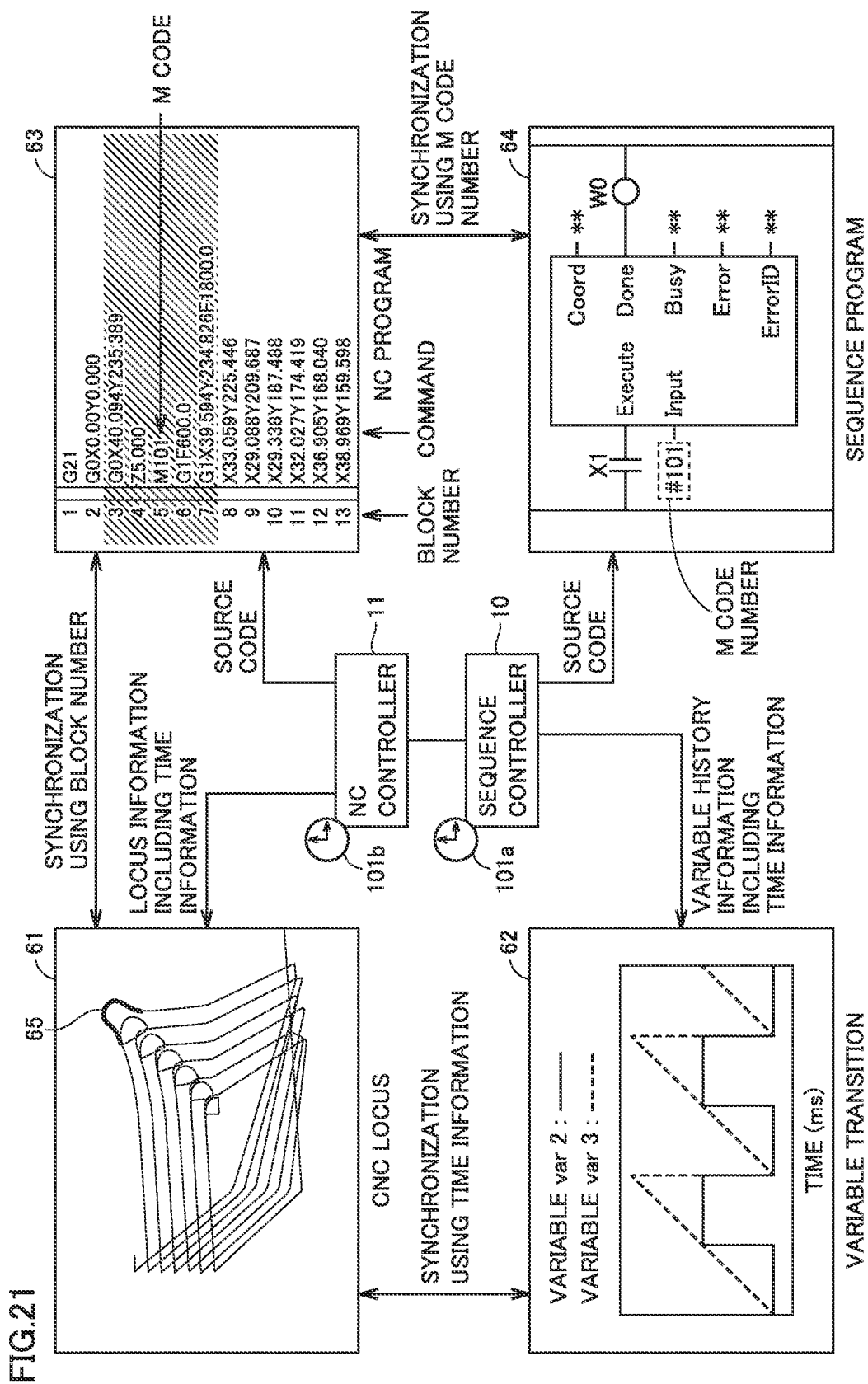
FIG. 21 is a schematic diagram illustrating a control system according to a first modification.

FIG. 21 is a schematic diagram illustrating control system 1 according to a first modification. In control system 1 of FIG. 20, sequence controller 10 and NC controller 11 are independent devices and are connected to each other through the network. Sequence controller 10 and NC controller 11 have timers 101a, 101b that are time-synchronized with each other. Alternatively, sequence controller 10 and NC controller 11 may be time-synchronized with each other using, for example, time-sensitive networking (TSN) technology.

Because sequence controller 10 and NC controller 11 are time-synchronized with each other, the time information included in variable history information 34 generated by sequence controller 10 and the time information included in locus information 36 generated by NC controller 11 indicate the time on the same time axis. As a result, by selecting the target period, the designer can easily check the relationship between the portion corresponding to the target period in the locus indicated by locus information 36 and the portion corresponding to the target period in the transition of the value of the variable indicated by variable history information 34.

(2-I-2. Second Modification)

In the above embodiment, in step S5 of FIG. 14, first analysis unit 21 extracts element 361 having the same tool point position information and block number as the end point and block number corresponding to line segment object ID of the selected line segment from locus information 36. The target period is selected based on extracted element 361. However, in step S5, first analysis unit 21 may extract element 361 having the same block number as the block number corresponding to line segment object ID of the selected line segment from locus information 36. Accordingly, the target period can be selected in units of lines (blocks) of NC program 32.

<2-J. Appendix>

As described above, the embodiment includes the following disclosure.

(Configuration 1)

A control system (1) including:
a first controller (11) configured to control a machine tool (540) according to an NC program (32);
a second controller (10) configured to control a target instrument (550) according to a sequence program (30); and
a support device (200),
wherein the first controller (11) and the second controller (10) are time-synchronized with each other,
the support device (200) includes:
a first acquisition unit (21) configured to acquire locus information (36) in which a position of the machine tool (540) corresponding to an instruction value generated by execution of the NC program (32) is associated with first time information indicating a control time using the instruction value by the first controller (11); and
a second acquisition unit (22) configured to acquire variable history information (34) in which a value of a variable updated by execution of the sequence program (30) is associated with second time information indicating an update time,
the first time information and the second time information being generated by the first controller (11) and the second controller (10), respectively,
the support device (200) further includes:
a selection unit (41, 42, 44, 45) configured to select a target period from execution periods of the NC program (32) and the sequence program (30);
a first drawing unit (40) configured to display a first target portion corresponding to the target period in a locus indicated by the locus information (36) on a display device (208); and
a second drawing unit (43) configured to display a second target portion corresponding to the target period in transition of the value of the variable indicated by the variable history information (34) on the display device (208).

(Configuration 2)

The control system (1) according to configuration 1, wherein
the first drawing unit (40) displays the locus indicated by the locus information (36) on the display device (208),
the selection unit (41, 42) receives input of a designated section in the locus displayed on the display device (208), and selects a period corresponding to the designated section as the target period based on the locus information (36), and
the first drawing unit (40) displays the first target portion in the locus displayed on the display device (208) in a display format different from a remaining portion.

(Configuration 3)

The control system (1) according to configuration 1, wherein
the second drawing unit (43) displays the transition of the value of the variable indicated by the variable history information (34) on the display device (208),
the selection unit (44, 45) receives input of a designated period in the transition displayed on the display device (208), and selects the designated period as the target period, and
the second drawing unit (43) displays the second target portion corresponding to the target period in the transition displayed on the display device (208) in a display format different from a remaining portion.

(Configuration 4)

The control system (1) according to any one of configurations 1 to 3, wherein the support device (200) further includes a third drawing unit (47) configured to display a source code of a third target portion executed in the target period in the NC program (32) on the display device (208).

(Configuration 5)

The control system (1) according to configuration 4, wherein the support device (200) further includes a fourth drawing unit (49) configured to display a source code of a fourth target portion related to a signal in the sequence program (30) on the display device (208) in response to a fact that a command outputting the signal to the second controller is included in the third target portion of the NC program (32).

(Configuration 6)

The control system (1) according to any one of configurations 1 to 5, wherein the first controller (11) and the second controller (10) are included in one control device (100), and operate using a common timer (101) included in the control device (100).

(Configuration 7)

The control system (1) according to any one of configurations 1 to 5, wherein the first controller (11) and the second controller (10) include a first timer (101b) and a second timer (101a) that are time-synchronized with each other, respectively.

(Configuration 8)

An analysis method in a control system (1), the control system (1) including:
a first controller (11) configured to control a machine tool (540) according to an NC program (32); and
a second controller (10) configured to control a target instrument (550) according to a sequence program (30),
the first controller (11) and the second controller (10) being time-synchronized with each other,
the analysis method including:
acquiring locus information (36) in which a position of the machine tool (540) corresponding to an instruction value generated by execution of the NC program (32) is associated with first time information indicating a control time using the instruction value by the first controller (11); and
acquiring variable history information (34) in which a value of a variable updated by execution of the sequence program (30) is associated with second time information indicating an update time,
the first time information and the second time information being generated by the first controller (11) and the second controller (10), respectively,
the analysis method further including:
selecting a target period from execution periods of the NC program (32) and the sequence program (30);
displaying a first target portion corresponding to the target period in a locus indicated by the locus information (36) on a display device (208); and
displaying a second target portion corresponding to the target period in transition of the value of the variable indicated by the variable history information (34) on the display device (208).

(Configuration 9)

A program causing a computer to execute an analysis method in a control system (1), wherein
the control system (1) includes:
a first controller (11) configured to control a machine tool (540) according to an NC program (32); and
a second controller (10) configured to control a target instrument (550) according to a sequence program (30),
the first controller (11) and the second controller (10) are time-synchronized with each other,
the analysis method includes:
acquiring locus information (36) in which a position of the machine tool (540) corresponding to an instruction value generated by execution of the NC program (32) is associated with first time information indicating a control time using the instruction value by the first controller (11); and
acquiring variable history information (34) in which a value of a variable updated by execution of the sequence program (30) is associated with second time information indicating an update time,
the first time information and the second time information being generated by the first controller (11) and the second controller (10), respectively,
the analysis method further includes:
selecting a target period from execution periods of the NC program (32) and the sequence program (30);
displaying a first target portion corresponding to the target period in a locus indicated by the locus information (36) on a display device (208); and
displaying a second target portion corresponding to the target period in transition of the value of the variable indicated by the variable history information (34) on the display device (208).

Although the embodiment of the present invention have been described, it should be considered that the disclosed embodiment is an example in all respects and not restrictive. The scope of the present invention is indicated by the claims, and it is intended that all modifications within the meaning and scope of the claims are included in the present invention.

REFERENCE SIGNS LIST

1: control system, 2: field network, 10: sequence controller, 11: NC controller, 12: shared memory, 13: variable management unit, 14: interpreter, 15: NC instruction value arithmetic unit, 16, 17: instruction value, 21: first analysis unit, 22: second analysis unit, 23: third analysis unit, 24: fourth analysis unit, 30: sequence program, 32: NC program, 34: variable history information, 36: locus information, 37: line segment information, 38: system program, 40, 43, 47, 49: drawing unit, 41, 44: input reception unit, 42, 45, 46, 48: target portion determination unit, 61, 62, 63, 64: window, 65: target portion, 66a, 66b: point, 67a, 67b: slider, 68a, 68b: input field, 70: locus, 71: first target portion, 72: graph, 100: control device, 101, 101a, 101b: timer, 102, 202: processor, 104: chip set, 106: main storage device, 108: secondary storage device, 110: host network controller, 112, 220: USB controller, 114: memory card interface, 116: memory card, 120: internal bus controller, 122: I/O unit, 130: field network controller, 200: support device, 204: main memory, 206: input device, 208: display device, 210: storage, 212: optical drive, 214: recording medium, 218: processor bus, 341, 361, 371: element, 500: field device, 510: remote I/O device, 520, 530: servo driver, 522, 532: servo motor, 540: CNC machine tool, 541: tool, 550: conveyance device, 554: workbench, 2104: support program, W: workpiece

The invention claimed is:

1. A control system comprising:
   a first controller configured to control a machine tool according to an NC program;
   a second controller configured to control a target instrument according to a sequence program; and
   a support device,
   wherein the first controller and the second controller are time-synchronized with each other,
   the support device includes a central processing unit (CPU) configured to at least:
   acquire locus information in which a position of the machine tool corresponding to an instruction value generated by execution of the NC program is associated with first time information indicating a control time using the instruction value by the first controller; and
   acquire variable history information in which a value of a variable updated by execution of the sequence program is associated with second time information indicating an update time,
   the first time information and the second time information being generated by the first controller and the second controller, respectively,
   the CPU of the support device is further configured to:
   select a target period from execution periods of the NC program and the sequence program;
   display a first target portion corresponding to the target period in a locus indicated by the locus information on a display device; and
   display a second target portion corresponding to the target period in transition of the value of the variable indicated by the variable history information on the display device.

2. The control system according to claim 1, wherein the CPU of the support device is configured to:
   display the locus indicated by the locus information on the display device,
   receive input of a designated section in the locus displayed on the display device, and select a period corresponding to the designated section as the target period based on the locus information, and
   display the first target portion in the locus displayed on the display device in a display format different from a remaining portion.

3. The control system according to claim 1, wherein the CPU of the support device is configured to:
   display the transition of the value of the variable indicated by the variable history information on the display device,
   receive input of a designated period in the transition displayed on the display device, and select the designated period as the target period, and
   display the second target portion in the transition displayed on the display device in a display format different from a remaining portion.

4. The control system according to claim 1, wherein the CPU of the support device is further configured to display a source code of a third target portion executed in the target period in the NC program on the display device.

5. The control system according to claim 4, wherein the CPU of the support device is further configured to display a source code of a fourth target portion related to a signal in the sequence program on the display device in response to a fact that a command outputting the signal to the second controller is included in the third target portion of the NC program.

6. The control system according to claim 1, wherein the first controller and the second controller are included in one control device, and operate using a common timer included in the control device.

7. The control system according to claim 1, wherein the first controller and the second controller include a first timer and a second timer that are time-synchronized with each other, respectively.

8. An analysis method in a control system, the control system including:
   a first controller configured to control a machine tool according to an NC program; and
   a second controller configured to control a target instrument according to a sequence program,
   the first controller and the second controller being time-synchronized with each other,
   the analysis method comprising:
   acquiring locus information in which a position of the machine tool corresponding to an instruction value generated by execution of the NC program is associated with first time information indicating a control time using the instruction value by the first controller; and
   acquiring variable history information in which a value of a variable updated by execution of the sequence program is associated with second time information indicating an update time,
   the first time information and the second time information being generated by the first controller and the second controller, respectively,
   the analysis method further comprising:
   selecting a target period from execution periods of the NC program and the sequence program;
   displaying a first target portion corresponding to the target period in a locus indicated by the locus information on a display device; and
   displaying a second target portion corresponding to the target period in transition of the value of the variable indicated by the variable history information on the display device.

9. The analysis method according to claim 8, wherein
   displaying the first target portion includes displaying the locus indicated by the locus information on the display device,
   selecting the target period includes receiving input of a designated section in the locus displayed on the display device, and selecting a period corresponding to the designated section as the target period based on the locus information, and
   displaying the first target portion includes displaying the first target portion in the locus displayed on the display device in a display format different from a remaining portion.

10. The analysis method according to claim 8, wherein
    displaying the second target portion includes displaying the transition of the value of the variable indicated by the variable history information on the display device,
    selecting the target period includes receiving input of a designated period in the transition displayed on the display device, and selecting the designated period as the target period, and
    displaying the second target portion includes displaying the second target portion in the transition displayed on the display device in a display format different from a remaining portion.

11. The analysis method according to claim 8, wherein the analysis method comprises displaying a source code of a third target portion executed in the target period in the NC program on the display device.

12. The analysis method according to claim 11, wherein the analysis method comprises displaying a source code of a fourth target portion related to a signal in the sequence program on the display device in response to a fact that a command outputting the signal to the second controller is included in the third target portion of the NC program.

13. A non-transitory computer-readable storage medium storing a program causing a computer to execute an analysis method in a control system, wherein
the control system includes:
a first controller configured to control a machine tool according to an NC program; and
a second controller configured to control a target instrument according to a sequence program,
the first controller and the second controller are time-synchronized with each other,
the analysis method includes:
acquiring locus information in which a position of the machine tool corresponding to an instruction value generated by execution of the NC program is associated with first time information indicating a control time using the instruction value by the first controller; and
acquiring variable history information in which a value of a variable updated by execution of the sequence program is associated with second time information indicating an update time,
the first time information and the second time information being generated by the first controller and the second controller, respectively,
the analysis method further includes:
selecting a target period from execution periods of the NC program and the sequence program;
displaying a first target portion corresponding to the target period in a locus indicated by the locus information on a display device; and
displaying a second target portion corresponding to the target period in transition of the value of the variable indicated by the variable history information on the display device.

* * * * *